United States Patent
Bobba et al.

(10) Patent No.: US 9,880,842 B2
(45) Date of Patent: Jan. 30, 2018

(54) USING CONTROL FLOW DATA STRUCTURES TO DIRECT AND TRACK INSTRUCTION EXECUTION

(71) Applicant: Intel Corporation, Santa Clara, CA (US)

(72) Inventors: Jayaram Bobba, Portland, OR (US); Ruchira Sasanka, Hillsboro, OR (US); Jeffrey J. Cook, Portland, OR (US); Abhinav Das, San Jose, CA (US); Arvind Krishnaswamy, San Jose, CA (US); David J. Sager, Portland (CA); Jason M. Agron, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 826 days.

(21) Appl. No.: 13/834,049

(22) Filed: Mar. 15, 2013

(65) Prior Publication Data

US 2014/0281424 A1 Sep. 18, 2014

(51) Int. Cl.
*G06F 9/30* (2006.01)
*G06F 11/07* (2006.01)
(Continued)

(52) U.S. Cl.
CPC .......... *G06F 9/3005* (2013.01); *G06F 11/076* (2013.01); *G06F 11/0715* (2013.01);
(Continued)

(58) Field of Classification Search
None
See application file for complete search history.

(56) References Cited

U.S. PATENT DOCUMENTS 5,829,017 A 10/1998 Ohtsuka
5,835,775 A 11/1998 Washington et al.
(Continued)

FOREIGN PATENT DOCUMENTS

CN 101763291 A 6/2010
CN 102016799 A 4/2011
(Continued)

OTHER PUBLICATIONS

John Hennessy, "Computer Architecture—A Quantitative Approach", 2003, Elsevier Science, third edition, pp. 112-115.*
(Continued)

*Primary Examiner* — Keith Vicary
*Assistant Examiner* — Courtney Carmichael-Moody
(74) *Attorney, Agent, or Firm* — Lowenstein Sandler LLP

(57) ABSTRACT

A mechanism for tracking the control flow of instructions in an application and performing one or more optimizations of a processing device, based on the control flow of the instructions in the application, is disclosed. Control flow data is generated to indicate the control flow of blocks of instructions in the application. The control flow data may include annotations that indicate whether optimizations may be performed for different blocks of instructions. The control flow data may also be used to track the execution of the instructions to determine whether an instruction in a block of instructions is assigned to a thread, a process, and/or an execution core of a processor, and to determine whether errors have occurred during the execution of the instructions.

23 Claims, 13 Drawing Sheets

(51) Int. Cl.
*G06F 9/45* (2006.01)
*G06F 11/34* (2006.01)

(52) U.S. Cl.
CPC .......... *G06F 11/0721* (2013.01); *G06F 8/433* (2013.01); *G06F 11/3466* (2013.01)

(56) References Cited

U.S. PATENT DOCUMENTS

| | | | |
|---|---|---|---|
| 5,857,097 A | 1/1999 | Henzinger et al. | |
| 5,872,987 A | 2/1999 | Wade et al. | |
| 5,890,008 A | 3/1999 | Panwar et al. | |
| 5,933,627 A | 8/1999 | Parady | |
| 5,944,816 A * | 8/1999 | Dutton | G06F 9/3851 710/266 |
| 5,999,734 A | 12/1999 | Willis et al. | |
| 6,077,315 A | 6/2000 | Greenbaum et al. | |
| 6,219,833 B1 | 4/2001 | Solomon et al. | |
| 6,247,107 B1 | 6/2001 | Christie | |
| 6,253,370 B1 | 6/2001 | Abadi et al. | |
| 6,622,301 B1 | 9/2003 | Hirooka et al. | |
| 6,711,667 B1 | 3/2004 | Ireton | |
| 6,934,865 B2 * | 8/2005 | Moritz | G06F 1/3203 713/320 |
| 7,010,787 B2 | 3/2006 | Sakai | |
| 7,103,757 B1 | 9/2006 | Kashyap | |
| 7,178,137 B1 | 2/2007 | Peak et al. | |
| 7,346,902 B2 | 3/2008 | Dutt et al. | |
| 7,373,640 B1 | 5/2008 | English et al. | |
| 7,446,773 B1 | 11/2008 | Alben et al. | |
| 7,466,316 B1 | 12/2008 | Alben et al. | |
| 7,503,039 B2 | 3/2009 | Inoue et al. | |
| 7,603,664 B2 | 10/2009 | Dutt et al. | |
| 7,702,499 B1 * | 4/2010 | Lavagno | G06F 11/3612 703/27 |
| 7,734,895 B1 | 6/2010 | Agarwal et al. | |
| 7,765,536 B1 | 7/2010 | Gordy et al. | |
| 7,814,486 B2 | 10/2010 | Papakipos et al. | |
| 7,962,724 B1 | 6/2011 | Ali | |
| 8,127,081 B2 | 2/2012 | Lee et al. | |
| 8,136,102 B2 | 3/2012 | Papakipos et al. | |
| 8,181,168 B1 | 5/2012 | Lee et al. | |
| 8,209,517 B1 | 6/2012 | Rozas et al. | |
| 8,214,808 B2 | 7/2012 | Day et al. | |
| 8,387,034 B2 | 2/2013 | Gordy et al. | |
| 8,418,179 B2 | 4/2013 | Papakipos et al. | |
| 8,473,935 B2 | 6/2013 | Grice | |
| 8,527,973 B2 | 9/2013 | Little et al. | |
| 8,789,031 B2 | 7/2014 | Liu et al. | |
| 8,935,678 B2 | 1/2015 | Wu et al. | |
| 2004/0073899 A1 | 4/2004 | Luk et al. | |
| 2004/0078779 A1 | 4/2004 | Dutt et al. | |
| 2004/0078780 A1 | 4/2004 | Dutt et al. | |
| 2004/0078785 A1 | 4/2004 | Dutt et al. | |
| 2005/0257005 A1 | 11/2005 | Jeddeloh | |
| 2006/0005176 A1 | 1/2006 | Kawahara et al. | |
| 2006/0005179 A1 | 1/2006 | Kawahara et al. | |
| 2006/0136878 A1 | 6/2006 | Raghunath et al. | |
| 2006/0218432 A1 | 9/2006 | Traskov et al. | |
| 2007/0038987 A1 | 2/2007 | Ohara et al. | |
| 2007/0079281 A1 | 4/2007 | Liao et al. | |
| 2007/0169042 A1 | 7/2007 | Janczewski | |
| 2007/0174562 A1 | 7/2007 | Jeddeloh | |
| 2007/0174750 A1 * | 7/2007 | Borin | G06F 11/1004 714/732 |
| 2007/0174828 A1 | 7/2007 | O'Brien et al. | |
| 2007/0226696 A1 | 9/2007 | Radhakrishnan et al. | |
| 2007/0234315 A1 | 10/2007 | Branda et al. | |
| 2007/0283337 A1 | 12/2007 | Kasahara et al. | |
| 2007/0294680 A1 | 12/2007 | Papakipos et al. | |
| 2008/0140904 A1 | 6/2008 | Jeddeloh | |
| 2008/0141268 A1 | 6/2008 | Tirumalai et al. | |
| 2008/0163183 A1 | 7/2008 | Li et al. | |
| 2008/0288751 A1 | 11/2008 | Kocev | |
| 2009/0006813 A1 | 1/2009 | Singhal et al. | |
| 2009/0064115 A1 | 3/2009 | Sheynin et al. | |
| 2009/0100248 A1 * | 4/2009 | Kami | G06F 9/50 712/30 |
| 2009/0172353 A1 | 7/2009 | Su et al. | |
| 2010/0042981 A1 | 2/2010 | Dreyer et al. | |
| 2010/0205599 A1 | 8/2010 | Vaidya et al. | |
| 2010/0235611 A1 | 9/2010 | Yamashita | |
| 2010/0262779 A1 | 10/2010 | Potkonjak | |
| 2010/0268893 A1 | 10/2010 | Luttrell | |
| 2010/0269102 A1 | 10/2010 | Latorre et al. | |
| 2010/0274972 A1 | 10/2010 | Babayan et al. | |
| 2011/0067015 A1 | 3/2011 | Takagi et al. | |
| 2011/0119660 A1 | 5/2011 | Tanaka | |
| 2011/0145502 A1 | 6/2011 | Joshi et al. | |
| 2011/0167416 A1 | 7/2011 | Sager et al. | |
| 2012/0297168 A1 | 11/2012 | Chen et al. | |
| 2013/0024675 A1 * | 1/2013 | Lovett | G06F 9/322 712/233 |
| 2014/0013058 A1 | 1/2014 | Hooker et al. | |
| 2014/0325184 A1 * | 10/2014 | Rotem | G06F 9/30083 712/42 |

FOREIGN PATENT DOCUMENTS

| | | |
|---|---|---|
| CN | 102156655 A | 8/2011 |
| CN | 102163143 A | 8/2011 |
| EP | 1094387 A2 | 4/2001 |
| EP | 2 241 969 A2 | 10/2010 |
| JP | H10254739 A | 9/1998 |
| JP | 2001-117890 A | 4/2001 |
| JP | 2007188523 | 7/2007 |
| JP | 2008-505423 A | 2/2008 |
| JP | 2010-254739 A | 11/2010 |
| JP | 2010-257445 A | 11/2010 |
| JP | 2011-022993 A | 2/2011 |
| JP | 2012-194947 A | 10/2012 |
| KR | 10-2003-0018720 | 3/2003 |
| KR | 10-2007-0106389 | 11/2007 |
| KR | 2007-0106389 A | 11/2007 |
| WO | 0045255 A2 | 8/2000 |
| WO | 2000045255 A2 | 8/2000 |
| WO | 2005/069123 A2 | 7/2005 |
| WO | 2007/016808 A1 | 2/2007 |
| WO | 2012/087561 A2 | 6/2012 |
| WO | 2012/087561 A3 | 8/2012 |
| WO | 2012/145992 A1 | 11/2012 |
| WO | 2013/147865 A1 | 10/2013 |

OTHER PUBLICATIONS

Rajendra Kumar and Dr. Singh, "Control Flow Prediction through Multiblock Formation in Paralell Register Sharing Archiecture", International Journal on Computer Science and Engineering, vol. 2, pp. 1179-1183.*
David Patterson and John Hennessy, Computer Organization and Design: The Hardware/Software Interface, 2012, Elsevier, 4th edition, pp. A-27-A-29.*
Combined Search and Examination report received for United Kingdom Patent Application No. 1402938.3, mailed on Aug. 1, 2014, 7 pages.
Combined Search and Examination report received for United Kingdom Patent Application No. 1402938.3, mailed Aug. 1, 2014.
Office Action and Search Report received for Taiwanese Patent Application No. 100145350, mailed on Apr. 16, 2014, 9 pages of Office Action including 5 pages of English Translation.
Office Action received for Korean Patent Application No. 10-2013-7016446, mailed on Sep. 22, 2014, 5 pages of Office Action including 2 pages of English Translation.
Office Action received for Japanese Patent Application No. 2013-546184, mailed on Jul. 1, 2014, 2 pages of Office Action including 1 page of English Translation.
International Preliminary Report on Patentability and Written Opinion received for PCT Patent Application No. PCT/US2011/063466, mailed on Jul. 4, 2013, 7 pages.
International Search Report and Written Opinion received for PCT Patent Application No. PCT/US2011/063466, mailed on Jun. 28, 2012, 10 pages.

(56) References Cited

OTHER PUBLICATIONS

Office Action and Search Report received for Chinese Patent Application No. 201410095950.7, mailed Apr. 13, 2016, 14 pages.
Office Action and Search Report received for Chinese Patent Application No. 201410095950.7, mailed Apr. 13, 2016, 25 pages.
Notice of Preliminary Rejection for Korean Patent Application No. 10-2014-29725, dated Apr. 20, 2015, 9 pages.
Notice of Reasons for Rejection for Japanese Patent Application No. 2014-029706, dated Jan. 27, 2015, 4 pages.
Komatsu et al., "A Global Code Scheduling Technique for Instruction Level Parallel Architectures," Jun. 15, 1996, Journal of Information Processing Society of Japan, Information Processing Society of Japan, vol. 37 (6), 15 pages.

* cited by examiner

TABLE 290

| Current Block | Not-Taken | Taken | Annotation |
|---|---|---|---|
| 1 | 6 | 2 | Taken: 2-WIDE |
| 2 | 3 | 4 | |
| 3 | N/A | 5 | |
| 4 | N/A | 5 | |
| 5 | 6 | 2 | Not-Taken: 4-WIDE |
| 6 | N/A | 1 | |

FIG. 2

TABLE 300

| Current Block | Not-Taken | Taken | Annotation |
|---|---|---|---|
| 1 | 6 | 2 | Instruction Count: 8 |
| 2 | 3 | 4 | Instruction Count: 3 |
| 3 | N/A | 5 | Instruction Count: 1 |
| 4 | N/A | 5 | Instruction Count: 2 |
| 5 | 6 | 2 | Instruction Count: 1 |
| 6 | N/A | 1 | Instruction Count: 6 |

FIG. 3

ALLOCATION
400

| INSTRUCTION BLOCK 405 | XOR | AND | SHIFT | OR | MULT | AND | SHIFT | BRANCH |
|---|---|---|---|---|---|---|---|---|
| THREAD ASSIGNMENT 410 | 1 | 1 | 0 | 1 | 0 | 1 | 0 | 1 |
| THREAD ASSIGNMENT 415 | 0 | 1 | 1 | 1 | 1 | 0 | 1 | 0 |

FIG. 4

TABLE
500

| Current Block | Not-Taken | Taken | Annotation |
|---|---|---|---|
| 1 | 6 | 2 | T0: 11010101 / T1: 01111010 |
| 2 | 3 | 4 | T0: 01010101 / T1: 10101010 |
| 3 | N/A | 5 | T0: 11011011 / T1: 10100110 |
| 4 | N/A | 5 | T0: 01011010 / T1: 11111011 |
| 5 | 6 | 2 | T0: 01101010 / T1: 10010101 |
| 6 | N/A | 1 | T0: 10010111 / T1: 01111101 |

FIG. 5

USING CONTROL FLOW DATA STRUCTURES TO DIRECT AND TRACK INSTRUCTION EXECUTION

TECHNICAL FIELD

Embodiments described herein generally relate to processing devices and, more specifically, relate to tracking the control flow of instructions.

BACKGROUND

Many applications (e.g., programs) exhibit phase behavior when the instructions of the application are executed by a processing device (e.g., a processor). As the execution of the application moves between different regions and/or blocks of instructions, the processing device may have different behavioral characteristics. For example, a certain block of instructions may contain unrelated instructions and may allow for multiple instructions to be executed simultaneously. In another example, a certain block of instructions may use certain components of a processing device more often (e.g., may use arithmetic logic units and/or memory registers more often).

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 2 is a table illustrating example control flow data for tracking the control flow of the execution of instructions in an application, according to one embodiment of the disclosure.

FIG. 3 is a table illustrating example control flow data for tracking the control flow of the execution of instructions in an application, according to another embodiment of the disclosure.

FIG. 4 is a block diagram illustrating an example allocation of instructions in a block of instructions to one or more units of execution, according to one embodiment.

FIG. 5 is a table illustrating example control flow data for tracking the control flow of the execution of instructions in an application, according to a further embodiment of the disclosure.

DESCRIPTION OF EMBODIMENTS

Figure 1:
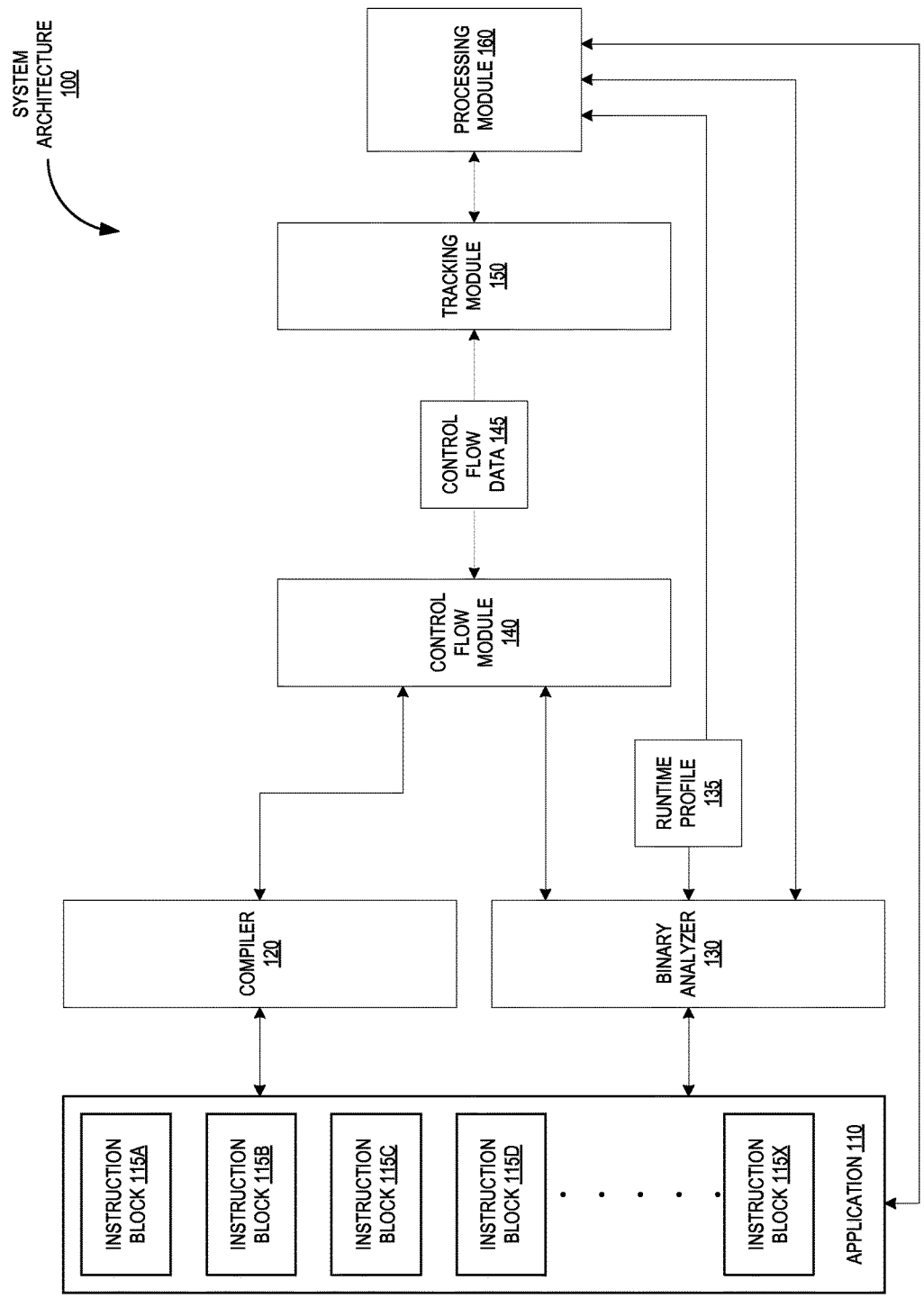
FIG. 1 is a block diagram of a system architecture including a control flow module and a tracking module for tracking the control flow of the execution of instructions in an application, according to one embodiment of the disclosure.

As discussed above, many applications (e.g., programs) exhibit phase behavior when the instructions of the application are executed by a processing device. Analyzing regions or blocks of instructions may allow a processing device to increase and/or optimize performance and/or power usage for each individual region or block of instructions. A possible hardware solution to identify regions or blocks of instructions is to provide a content-addressable memory (CAM) of instruction addresses corresponding to phase-transition. As the processing device executes each instruction, the processing device could access the CAM to determine if a new code region is being entered/exited and if an optimization needs to be activated. However, once the size of the CAM goes beyond a few entries, the CAM may be inefficient in terms of power consumption. In addition, a programmer and/or a compiler may insert additional instructions into the application itself (e.g., during compile time) to output information about which instruction of the application is currently executing. However, this may slow down the execution of the application and may add a considerable amount of overhead.

Embodiments of the disclosure provide for tracking the control flow of instructions in an application and performing one or more optimizations of a processing device, based on the control flow of the instructions in the application. In one embodiment, control flow data is generated to indicate the control flow of blocks of instructions in the application. The control flow data may include annotations that indicate whether optimizations may be performed for different blocks of instructions. The control flow data may also be used to track the execution of the instructions to determine whether an instruction in a block of instructions is assigned to a thread, a process, and/or an execution core of a processor, and to determine whether errors have occurred during the execution of the instructions. A processing device and/or a tracking module coupled to the processing device may track the execution of instructions and/or optimize the operation of the processing device based on the control flow data. In one embodiment, the control flow data may be represented using a table, which may allow the processing device and/or the tracking module to efficiently index into a single location or entry in the table.

Although the following embodiments may be described with reference to specific integrated circuits, such as in computing platforms or microprocessors, other embodiments are applicable to other types of integrated circuits and logic devices. Similar techniques and teachings of embodiments described herein may be applied to other types of circuits or semiconductor devices. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below.

Although the following embodiments are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

FIG. 1 is a block diagram of a system architecture 100 including a control flow module 140 and a tracking module 150 for tracking the control flow of the execution of instructions in an application, according to one embodiment of the disclosure. The system architecture also includes an application 110, a compiler 120, a binary analyzer 130, a runtime profile 135, control flow data 145, and a processing module 160.

The application 110 may be a program, a software module, a software component, and/or other software element that may be executing by the processing module 160. The application 110 may include a plurality of instructions. The instructions may include program code to cause processing module 160 to perform activities such as, but not limited to, reading data, writing data, processing data, formulating data, converting data, transforming data, etc. For example, the application 110 may be a binary file and/or an executable file that includes instructions to cause the processing module 160 to execute a media player to play media items (such as digital videos, digital music) or to cause the processing module 160 to execute a web browser. The instructions in the application 110 may be divided into blocks of instructions (e.g., a series or group of instructions), such as instruction blocks 115A through 115X.

The instruction blocks 115A through 115X may include a variety of different instructions (e.g., program instructions). For example, the instruction blocks 115A through 115X may include an ADD instruction (to add two or more values), a MULT instruction (to multiple two or more values), an exclusive-OR (XOR) instruction (to exclusive-or two or more values), an AND instruction (to perform a bit-wise and on two or more values), a store instruction (to store a value in a memory location, such as a register), a JUMP instruction (to direct the flow of execution of the instructions to a particular instruction), a BRANCH instruction (to direct the flow of execution of the instructions to a particular instruction based on one or more conditions, etc.). In one embodiment, the instruction blocks 115A through 115X may be basic blocks. A basic block may be a group (e.g., a block) of instructions that has one entry point (e.g., one instruction in the basic block is the destination of a JUMP and/or BRANCH instruction) and one exit point (e.g., the last instruction may be a JUMP or a BRANCH instruction to a different basic block).

Processing module 160 may execute instructions of the application 110. Instructions may include program code to cause processing module 160 to perform activities such as, but not limited to, reading data, writing data, processing data, formulating data, converting data, transforming data, etc. The processing module 160, as one illustrative example, may include a complex instruction set computer (CISC) microprocessor, a reduced instruction set computing (RISC) microprocessor, a very long instruction word (VLIW) microprocessor, a multi-core processor, a multithreaded processor, an ultra low voltage processor, an embedded processor, a processor implementing a combination of instruction sets, and/or any other processor device, such as a digital signal processor, for example. The processing module 160 may be a general-purpose processor, such as a Core™ i3, i5, i7, 2 Duo and Quad, Xeon™ Itanium™, XScale™ or StrongARM™ processor, which are available from Intel Corporation, of Santa Clara, Calif. Alternatively, the processing module 160 may be from another company, such as ARM Holdings, Ltd, MIPS, etc. The processing module 160 may be a special-purpose processor, such as, for example, a network or communication processor, compression engine, graphics processor, co-processor, embedded processor, an application specific integrated circuit (ASIC), a field programmable gate array (FPGA), a digital signal processor (DSP), or the like. The processing module 160 may be implemented on one or more chips. The processing module 160 may be a part of and/or may be implemented on one or more substrates using any of a number of process technologies, such as, for example, BiCMOS, CMOS, or NMOS.

In one embodiment, the processing module 160 may exhibit different behavior, characteristics, may use certain components of the processing module 160 more often (e.g., certain circuits within the processing module 160), and/or may function in a certain way when one or more of the instruction blocks 115A through 115X is executed by the processing module 160. For example, instruction block 115A may include a variety of instructions (e.g., program instructions) that perform arithmetical and/or logical functions (such as XOR, ADD, MULT, etc.). The processing module 160 may use arithmetic and logic units (ALUs) more when executing the instructions in instruction block 115A when compared to other instruction blocks. In another example, instruction block 115B may include unrelated instructions (e.g., instructions which do not depend on other instructions in the instruction block 115B). Unrelated instructions may allow multiple instructions to be executed by the processing module 160 simultaneously. In one embodiment, instruction level parallelism (ILP) may be a measure of how many instructions the processing module 160 may execute simultaneously. Because the instructions in instruction block 115 do are unrelated (e.g., the instructions do not depend on the results of other instructions), instruction block 115B may allow for a higher amount of (ILP) than other instruction blocks.

In one embodiment, the compiler 120 may generate the application 110 based on source code. Source code may be one or more computer instructions written using some human-readable language (e.g., a programming language, such as JAVA, C++, C, C#, etc.). The compiler 120 may be any processing logic that may comprise hardware (e.g., circuitry, dedicated logic, programmable logic, microcode, etc.), software (such as instructions run on a processing device), firmware, or a combination thereof, that may generate instructions (e.g., binary code, object code, program instructions, etc.) that can, with or without additional linkage processing, be executed by the processing module 160. In another embodiment, the compiler 120 may be a just-in-time (JIT) compiler. A JIT compiler may be a compiler that generates bytecode from source code. The bytecode may be an intermediate representation that is translated and/or interpreted by a virtual machine into instructions (e.g., binary code, object code, program instructions, etc.) that may be executed by processing module 160. The bytecode generated by a JIT compiler may be portable among different computer architectures. A virtual machine associated with each of the different computer architectures may translate and/or interpret the bytecode into instructions used by the computer architecture.

In one embodiment, the binary analyzer 130 may be processing logic that may comprise hardware (e.g., circuitry, dedicated logic, programmable logic, microcode, etc.), software (such as instructions run on a processing device), firmware, or a combination thereof, that may analyze the application 110 while the application 110 is executed (e.g., while the instructions and/or instruction blocks 115A through 115X are executed) by the processing module 160. The binary analyzer 130 may identify BRANCH and/or JUMP instructions in the application 110, may identify destinations for BRANCH and/or JUMP instructions, may identify types of instructions (e.g., instructions to access a memory or a register, arithmetic or logical operation instructions, etc.) in the instruction block 115A through 115X, may identify memory locations (e.g., registers) used by the instructions in the application 110, etc. The binary analyzer 130 may also identify the instruction blocks 115A through 115X (e.g., basic blocks) in the application 110. For example, the binary analyzer 130 may group multiple instructions of the application 110 into instruction block 115C. In one embodiment, the binary analyzer 130 may receive data about the execution of the instructions of application 110 from the processing module. The binary analyzer 130 may record and/or store data about the execution of the instructions of application 110 in runtime profile 135. The runtime profile 135 may include data such as the locations of BRANCH and/or JUMP instructions, the number of times each path of a BRANCH instruction is taken, the memory locations used and/or accessed by instructions, types of instructions, etc. In one embodiment, the runtime profile 135 may be data that indicates how instructions of the application 110 were executed and/or resources (e.g., memory registers, circuits and/or components of the processing module 160) that are used by the instructions of the application 110. The runtime profile may also include data indicating how long an instructions, operations, function, and/or other action took to execute. For example, the runtime profile 135 may include data indicating how much time it took the processing module 160 to execute a particular instruction and/or instruction block. The runtime profile 135 may also be referred to as a trace or an instruction trace.

In one embodiment, the control flow module 140 may generate control flow data 145 for the application 110. The control flow module 140 may be processing logic that may comprise hardware (e.g., circuitry, dedicated logic, programmable logic, microcode, etc.), software (such as instructions run on a processing device), firmware, or a combination thereof. The control flow data 145 may include data and/or information such identifiers for the instruction blocks 115A through 115X, destination identifiers (e.g., identifiers for one or more instruction blocks that a first instruction block may branch and/or jump to), and/or annotations for one or more of the instruction blocks 115A through 115X. The control flow data 145 is discussed in more detail below in conjunction with FIGS. 2, 3, and 5. The control flow module 140 may analyze the application 110 generated by the compiler 120 to generate the control flow data 145. The control flow module 140 may identify instruction blocks (e.g., instruction blocks 115A through 115X) from the instructions in the application 110. For example, the compiler 120 may group multiple instructions of the application 110 into instruction block 115D. The control flow module 140 may also identify destination instruction blocks for BRANCH and/or JUMP instructions. For example, instruction block 115A may include a BRANCH instruction that moves to instruction block 115B or instruction block 115D, depending on whether a condition associated with the BRANCH instruction is satisfied.

In one embodiment, the control flow module 140 may convert indirect BRANCH instructions into a series of COMPARE instructions and JUMP instructions. An indirect BRANCH instruction may be an instruction that specifies where an address is located, rather than specifying the address of the next instruction to execute. The control flow module 140 may generate a pair of COMPARE and JUMP instructions for each target of the indirect branch. For example, if an indirect branch instruction has a first target and a second target, the control flow module may generate a first COMPARE instruction that determines whether the next instruction address is equal to the first target and a first JUMP instruction that is executed if the first target is equal to the next instruction address, and may generate a second COMPARE instruction that determines whether the next instruction address is equal to the second target and a second JUMP instruction that is executed if the second target is equal to the next instruction address. An optimization may be used for returns, which are a form of indirect branch. For returns, the compiler 120 may know that a return transfers control to the instruction following its corresponding call. The target instruction of a return instruction may be found by maintaining a stack of call/return blocks in addition to the control flow table.

In one embodiment, the control flow module 140 may generate annotations for one or more of the instruction blocks 115A through 115X. The annotations may be included in the control flow data 145. The annotations may include data that may be used to track the execution of the instructions in the application 110, may be used to modify resources used by the processing module 160, may be used to allow the processing module 160 to operate more efficiently, and/or may be used to optimize the operation of the processing module 160. For example, the annotations may include information such as the amount of ILP that may be possible in an instruction block. In another example, the annotations may include information such as the number of instructions in an instruction block. This information may be used to identifier hard errors (e.g., a physical or hardware error in a memory, such as a register) and/or soft errors (e.g., an error in a signal or datum which may change an instruction and/or a data value).

In one embodiment, the control flow module 140 may communicate (e.g., transmit data to and/or receive data from) with the compiler 120 when generating the control flow data 145. For example, as the compiler 120 compiles source code to generate the instructions for the application 110, the compiler 120 may provide the instructions to the control flow module 140 and the control flow module 140 may analyze the instructions to generate the control flow data 145. In another embodiment, the control flow module 140 may be included as a component of and/or as part of the compiler 120. For example, the control flow module 140 may be a software modules and/or component used by the compiler 120 when the compiler 120 generates the instructions for the application 110. The compiler 120 may generate the control flow data 145 at the same time or around the same time the compiler 120 generates the instructions for the application 110 (e.g., generates the application 110).

In one embodiment, the control flow module 140 may communicate (e.g., transmit data to and/or receive data from) with the binary analyzer 130 when generating the control flow data 145. For example, the binary analyzer may generate the runtime profile 135 and may provide the runtime profile 135 to the control flow module 140. The control flow module 140 may analyze the runtime profile 135 to generate the control flow data 145. In another embodiment, the control flow module 140 may be included as a component of and/or as part of the binary analyzer. For example, binary analyzer 130 may generate the control flow data 145 at the same time or around the same time the binary analyzer 130 generates the runtime profile 135.

In one embodiment, the tracking module 150 may track the execution of one or more instructions in the application 110, may allow the processing module 160 to operate more efficiently, and/or may optimize the operation of the processing module using the control flow data 145. The tracking module 150 may be processing logic that may comprise hardware (e.g., circuitry, dedicated logic, programmable logic, microcode, etc.), software (such as instructions run on a processing device), firmware, or a combination thereof. For example, the tracking module 150 may be a finite state machine that is implemented in hardware. The finite state machine include a programmable logic device, a programmable logic controller, logic gates, flip flops and/or relays. The finite state machine may also include one or more memories and/or registers to store state variables. The finite state machine may further include one or more blocks of combinational logic that determine whether a state transition should occur and one or more blocks of combinational logic that determines the output of the finite state machine. In one embodiment, tracking module 150 may be part of the processing module 160. For example, the tracking module 150 may be a circuit within the processing module 160.

In one embodiment, the tracking module 150 may modify the resources used by the processing module 160 and/or may optimize the operation of the processing module 160 based on the control flow data 145. For example, tracking module 150 may determine that instruction block 115A has low ILP. The processing module 160 may include multiple execution cores (e.g., four execution cores, eight execution cores, etc.) and the tracking module 150 may instruct the processing module 160 to deactivate, power down, and/or refrain from using some of the execution cores to reduce the amount of power used by the processing module 160. In another example, the tracking module 150 may determine that an instruction block (e.g., instruction block 115C) includes mostly arithmetic and logical operation instructions (e.g., ADD, XOR, etc.). The tracking module 150 may instruct the processing module 160 to prepare the circuits, components, and/or modules that perform arithmetic and logical operations for the instructions in the upcoming instruction block.

In one embodiment, the tracking module 150 may determine whether the modification of resources used by the processing module 160 is having an effect of the operation of the processing module 160. For example, the tracking module 150 may determine whether powering down or deactivating one or more components in the processing module 160 is allowing a computing device to save power (e.g., use less energy or battery power). In another example, the tracking module 150 may determine whether preparing circuits, components, and/or modules of the processing module 160 that are used by an upcoming instruction block, is increasing the speed of the execution of the instructions in the application 110. In one embodiment, if the tracking module 150 determines that the modification of resources used by the processing module 160 is not having an effect of the operation of the processing module 160, the tracking module 150 may update the control flow data 145 to indicate that the modification of resources should not be performed (e.g., to indicate that an optimization should not be performed). For example, the tracking module 150 may remove an annotation (which may include data indicative of an optimization) or may add data to an annotation indicating that the modification of resources should not be performed.

In another embodiment, the tracking module 150 may track the execution of the instructions in the application 110 using the control flow data 145. For example, the processing module 160 may determine that the processing module 160 is executing instruction block 115A and that the instruction block 115A includes twelve instructions. If the processing module 160 jumps to executing instructions in another instruction block (e.g., instruction block 115D) after executing less than twelve instructions, the tracking module may determine that an error (e.g., a hard error and/or a soft error) has occurred because less than twelve instructions were executed before instructions from the other instruction block were executed. The tracking module 150 may send or raise an error flag and the processing module 160 may perform additional operations based on the error flag (e.g., may terminate the execution of the instructions for application 110). In another example, the processing module 160 may execute the instructions in an instruction block using different processes, threads, and/or execution cores. As the processing module 160 executes an instruction from an instruction block, the processing module 160 may assign the instruction to a process, thread and/or execution core. The tracking module 150 may add and/or update annotations to the control flow data 145 to indicate which process, thread, and/or execution core an instruction in the instruction block is assigned to.

In one embodiment, one or more of the compiler 120, the binary analyzer 130, the control flow module 140, and the tracking module 150 may reside in the same computing device where the processing module 160 resides. For example, the compiler 120, the tracking module 150, and the processing module 160 may reside on the same computing device. In another example, the binary analyzer 130, the control flow module 140, and the tracking module 150 may reside in the same computing device where the processing module 160 resides. Examples of a computing device may include, but are not limited to, a mobile communications device such as a cellular handset (e.g., a cellular phone) or smart phone, a mobile computing device such as a tablet computer, a netbook, a notebook computer, a laptop computer, a desktop computer, a server computer, and so on.

FIG. 2 is a table 290 illustrating example control flow data for tracking the control flow of the execution of instructions in an application, according to one embodiment of the disclosure. As discussed above, a tracking module may use the table 290 (e.g., control flow data) to modify resources used by a processing module (e.g., a processor) to allow the processing module to operate more efficiently, and/or to optimize the operation of the processing module. Although the control flow data is illustrated in the form of a table (e.g., table 290), it should be understood that the control flow data may be represented using various other data structures and/or representations. For example, the control flow data may be represented using a graph, a tree, a list, etc.

The table 290 includes four columns. The first column is labeled "Current Block" and includes identifiers (e.g., block identifiers) for six different instruction blocks (e.g., basic blocks). Referring back to FIG. 1, instruction block 115A may be labeled using the identifier "1," instruction block 115B may be labeled using the identifier "2," instruction block 115C may be labeled using the identifier "3," etc. It should be understood that in other embodiments, the identifiers may be any alpha-numeric value, string, number and/or other value that may be used to identify an instruction block (e.g., a basic block). The second column is labeled "Not Taken" and includes identifiers for a destination instruction block when a BRANCH instruction is not taken. For example, the last instruction in instruction block "1" may be a BRANCH instruction and during execution, the condition for the BRANCH instruction may not be satisfied. The processing module may jump and/or proceed to the instructions in the instruction block "6" when the condition for the BRANCH instruction is not satisfied. In one embodiment, the table 290 may indicate that an instruction block does not include a BRANCH instruction with a condition. For example, instruction block "3" has the value "N/A" for the Not-Taken column. This may indicate that the last instruction in instruction block "3" is an unconditional BRANCH or a JUMP instruction. The third column is labeled "Taken" and includes identifiers for a destination instruction block when a BRANCH instruction is taken. For example, the last instruction in instruction block "1" may be a BRANCH instruction and during execution, the condition for the BRANCH instruction may be satisfied. The processing module may jump and/or proceed to the instructions in the instruction block "2" when the condition for the BRANCH instruction is satisfied. The fourth column is labeled "Annotation" and includes one or more annotations for the instruction block identified in the "Current Block" column.

Each row of the table 290 includes an identifier for a current instruction block (e.g., an identifier for the instruction block that contains the currently executing instruction), a first identifier for a destination instruction block if a BRANCH instruction is not taken, and a second identifier for a destination instruction block if a BRANCH instruction is taken, and annotations for the current block (e.g., the current instruction block or current basic block). For example, the first row of table 290 indicates that instruction block "1," will jump to instruction block "6" if a BRANCH instruction at the end of instruction block "1" is not taken or will jump to instruction block "2" if a BRANCH instruction at the end of instruction block "2" is taken. The first row of table also includes the annotation "TAKEN: 2-WIDE." This annotation may indicate the amount or level of ILP that may be possible when a processing module executes instructions from instruction block "2." For example, the annotation "TAKEN: 2-WIDE" may indicate that the processing module may be able to execute as many as two instructions simultaneously when executing instructions from instruction block "2." The tracking module may instruct the processing module to use two execution cores and to power down other execution cores, based on the annotation for instruction block "1." In another example, the annotation "Not-Taken: 4-WIDE" for the fifth row of table 290 may indicate that the processing module may be able to execute as many as four instructions simultaneously when executing instructions from instruction block "6." The tracking module may instruct the processing module to use four execution cores, based on the annotation for instruction block 5. In other embodiments, the annotations for the instructions blocks may include any alphanumeric value, text value, and/or number value.

In one embodiment, the table 290 allows the tracking module to track the execution of blocks of instructions by indexing into a single entry and/or location in the table 290. This allows the tracking module to operate more efficiently than using a CAM (which would require a lookup of the entire CAM) to track the execution of the blocks of instructions.

FIG. 3 is a table 300 illustrating example control flow data for tracking the control flow of the execution of instructions in an application, according to another embodiment of the disclosure. As discussed above, a tracking module may use the table 300 (e.g., control flow data) to track instructions executed by a processing module. Although the control flow data is illustrated in the form of a table (e.g., table 300), it should be understood that the control flow data may be represented using various other data structures and/or representations. For example, the control flow data may be represented using a graph, a tree, a list, etc.

The table 300 includes four columns. The first column is labeled "Current Block" and includes identifiers (e.g., block identifiers) for six different instruction blocks (e.g., basic blocks). The second column is labeled "Not Taken" and includes identifiers for a destination instruction block when a BRANCH instruction is not taken. In one embodiment, the table 300 may indicate that an instruction block does not include a BRANCH instruction with a condition. For example, instruction block "4" has the value "N/A" for the Not-Taken column which may indicate that the last instruction in instruction block "4" is an unconditional BRANCH or a JUMP instruction. The third column is labeled "Taken" and includes identifiers for a destination instruction block when a BRANCH instruction is taken. In other embodiments, the identifiers may be any alpha-numeric value, string, number and/or other value that may be used as identifiers to identify an instruction block (e.g., a basic block). The fourth column is labeled "Annotation" and includes one or more annotations for the instruction block identified in the "Current Block" column.

Each row of the table 300 includes an identifier for a current instruction block (e.g., an identifier for the instruction block that contains the currently executing instruction), a first identifier for a destination instruction block if a BRANCH instruction is not taken, and a second identifier for a destination instruction block if a BRANCH instruction is taken, and annotations for the current block (e.g., the current instruction block or current basic block). For example, the second row of table 300 indicates that instruction block "2," will jump to instruction block "3" if a BRANCH instruction at the end of instruction block "4" is not taken or will jump to instruction block "2" if the BRANCH instruction at the end of instruction block "3" is taken. The second row of table also includes the annotation "Instruction Count: 3." The annotation may indicate that the instruction block "2" includes three instructions. Based on the annotation, the tracking module may track the execution of instructions in the instruction blocks to determine whether a soft error and/or a hard error have occurred. For example, the tracking module may determine that a soft error has occurred because the processing module executes less than three instructions when executing instruction block "2." In other embodiments, the annotations for the instructions blocks may include any alphanumeric value, text value, and/or number value to represent the number of instructions in an instruction block.

In one embodiment, the table 300 allows the tracking module to track the execution of blocks of instructions by indexing into a single entry and/or location in the table 300. This allows the tracking module to operate more efficiently than using a CAM (which would require a lookup of the entire CAM) to track the execution of the blocks of instructions.

FIG. 4 is a block diagram illustrating an example allocation 400 of instructions in a block of instructions to one or more units of execution, according to one embodiment. The allocation 400 includes instruction block 405, thread assignment 410, and thread assignment 415. The instruction block 405 includes an XOR instruction, followed by an AND instruction, followed by a SHIFT instruction, followed by an OR instruction, followed by a MULT instruction, followed by an AND instruction, followed by a SHIFT instruction, followed by a BRANCH instructions. As discussed above, individual instructions in a block of instructions (e.g., instruction block 405) may be assigned to different units of execution (e.g., different threads and/or different processes) or different execution cores of a processor. For example, the individual instructions in the instruction block 405 may be assigned to one or more threads. In another example, the individual instructions in the instruction block 405 may be assigned to one or more processes. In a further example, the individual instructions in the instruction block 405 may be assigned to different execution cores (e.g., cores 1002A illustrated in FIG. 10 and cores 1106 and 1107 illustrated in FIG. 11).

As illustrated in FIG. 4, the instructions in instruction block 405 may be assigned to one or more threads (e.g., units of execution). Thread assignment 410 indicates whether an instruction will be executed by a first thread and the thread assignment 415 may indicate whether an instruction will be executed by a second thread. A "1" value indicates that a thread will execute an instruction and a "0" value indicates that a thread will not execute an instruction. For example, the XOR instruction is assigned to the first thread, the MULT instruction is assigned to the second thread, and the OR instruction is assigned to both the first thread and the second thread.

FIG. 5 is a table 500 illustrating example control flow data for tracking the control flow of the execution of instructions in an application, according to a further embodiment of the disclosure. As discussed above, a tracking module may use the table 500 (e.g., control flow data) to track instructions executed by a processing module. Although the control flow data is illustrated in the form of a table (e.g., table 500), it should be understood that the control flow data may be represented using various other data structures and/or representations. For example, the control flow data may be represented using a graph, a tree, a list, etc.

The table 500 includes four columns. The first column is labeled "Current Block" and includes identifiers (e.g., block identifiers) for six different instruction blocks (e.g., basic blocks). The second column is labeled "Not Taken" and includes identifiers for a destination instruction block when a BRANCH instruction is not taken. In one embodiment, the table 500 may indicate that an instruction block does not include a BRANCH instruction with a condition. For example, instruction block "4" has the value "N/A" for the Not-Taken column which may indicate that the last instruction in instruction block "4" is an unconditional BRANCH or a JUMP instruction. The third column is labeled "Taken" and includes identifiers for a destination instruction block when a BRANCH instruction is taken. In other embodiments, the identifiers may be any alpha-numeric value, string, number and/or other value that may be used as identifiers to identify an instruction block (e.g., a basic block). The fourth column is labeled "Annotation" and includes one or more annotations for the instruction block identified in the "Current Block" column.

Each row of the table 500 includes an identifier for a current instruction block (e.g., an identifier for the instruction block that contains the currently executing instruction), a first identifier for a destination instruction block if a BRANCH instruction is not taken, and a second identifier for a destination instruction block if a BRANCH instruction is taken, and annotations for the current block (e.g., the current instruction block or current basic block). For example, the first row of table 500 indicates that instruction block "1," will jump to instruction block "6" if a BRANCH instruction at the end of instruction block "1" is not taken or will jump to instruction block "2" if the BRANCH instruction at the end of instruction block "1" is taken. The first row of table 500 also includes the annotation "T0: 11010101/T1: 01111010." The annotation for instruction block "1" may indicate whether an instruction from the instruction block "1" is assigned to a first thread T0, a second thread T1, or to both. Referring back to FIG. 4, the instruction block "1" may include the eight instructions illustrated in instruction block 405. The annotation "T0: 11010101/T1: 01111010" indicates that the first, second, fourth, sixth, and eighth instructions in the instruction block "1" (e.g., instruction block 405) are assigned to the thread T0, and the second, third, fourth, fifth and seventh instructions in the instruction block "1" are assigned to the thread T1.

In one embodiment, the table 500 allows the tracking module to track the execution of blocks of instructions by indexing into a single entry and/or location in the table 500. This allows the tracking module to operate more efficiently than using a CAM (which would require a lookup of the entire CAM) to track the execution of the blocks of instructions.

Figure 6:
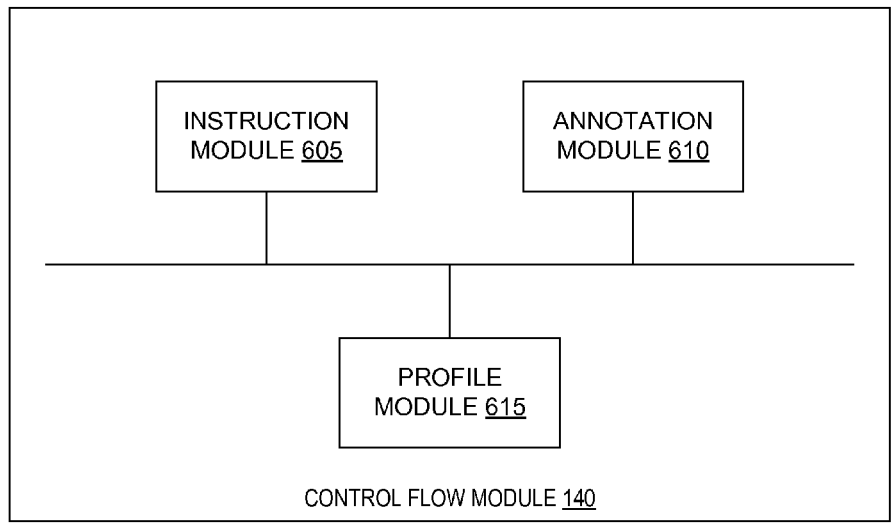
FIG. 6 is a block diagram illustrating a control flow module to generate control flow data, according to an embodiment of the disclosure.

FIG. 6 is a block diagram illustrating a control flow module 140 to generate control flow data, according to an embodiment of the disclosure. The control flow module 140 includes an instruction module 605, an annotation module 610, and a profile module 615. The control flow module 140 may be processing logic that may comprise hardware (e.g., circuitry, dedicated logic, programmable logic, microcode, etc.), software (such as instructions run on a processing device), firmware, or a combination thereof. More or less components may be included in the control flow module 140 without loss of generality. For example, two of the modules may be combined into a single module, or one of the modules may be divided into two or more modules. In one embodiment, the control flow module 140 may generate control flow data (as discussed above in conjunction with FIGS. 1, 2, 3, and 5).

In one embodiment, the instruction module 605 may analyze an application (generated by a compiler). The instruction module 605 may identify instruction blocks (e.g., basic blocks) in the instructions in the application. The instruction module 605 may also identify destination instruction blocks for BRANCH and/or JUMP instructions in the instruction blocks of the application. The instruction module 605 may communicate (e.g., transmit data to and/or receive data from) with the compiler when generating the control flow data 145. For example, as the compiler compiles source code to generate the application, the compiler may provide the instructions to the instruction module 605 and the instruction module 605 may analyze the instructions to generate the control flow data.

In one embodiment, the profile module 615 may communicate (e.g., transmit data to and/or receive data from) with a binary analyzer. For example, the binary analyzer may generate a runtime profile and may provide the runtime profile to the profile module 615. The profile module 615 may identify instruction blocks (e.g., basic blocks) in the instructions in the application based on the runtime profile. The profile module 615 may also identify destination instruction blocks for BRANCH and/or JUMP instructions in the instruction blocks of the application based on the runtime profile. The profile module 615 may analyze the runtime profile to generate the control flow data.

In one embodiment, the annotation module 610 may generate annotations for one or more of the instruction. The annotations may be included in the control flow data. The annotations may include data that may be used to track the execution of the instructions in the application, as illustrated above and discussed in conjunction with FIGS. 3-5. The annotations may also include data that may be used to modify resources used by the processing module, to allow the processing module to operate more efficiently, and/or may be used to optimize the operation of the processing module. For example, the annotations may include information such as the amount of ILP that may be possible in an instruction block. In another example, the annotations may include information about which types of components and/or units of a processing device that an instruction block may use. This may allow the processing module to prepare the components and/or units that are used by the instructions.

Figure 7:
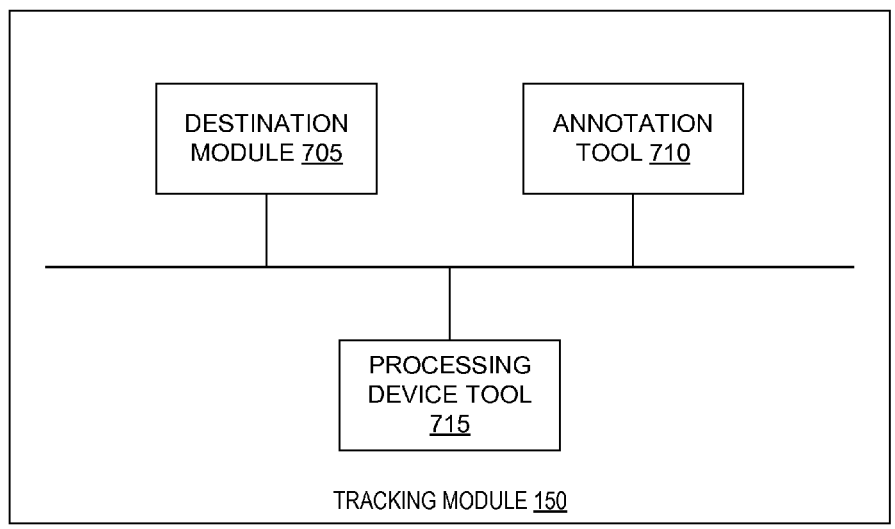
FIG. 7 is a block diagram illustrating a tracking module to track the execution instructions and/or modify resources used by a processing module, according to an embodiment of the disclosure.

FIG. 7 is a block diagram illustrating a tracking module 150 to track the execution of instructions and/or modify resources used by a processing module, according to an embodiment of the disclosure. The tracking module 150 may be processing logic that may comprise hardware (e.g., circuitry, dedicated logic, programmable logic, microcode, etc.), software (such as instructions run on a processing device), firmware, or a combination thereof. In one embodiment, the tracking module 150 may track the execution of one or more instructions in an application, may allow a processing module to operate more efficiently, and/or may optimize the operation of the processing module. The tracking module 150 may be processing logic that may comprise hardware (e.g., circuitry, dedicated logic, programmable logic, microcode, etc.), software (such as instructions run on a processing device), firmware, or a combination thereof. More or less components may be included in the tracking module 150 without loss of generality. For example, two of the modules may be combined into a single module, or one of the modules may be divided into two or more modules.

In one embodiment, the destination module 705 may determine a destination instruction block for the current instruction block that is executing on a processing module. For example, the destination module 705 may communicate with the processing module to determine the outcome of a BRANCH instruction. In another example, the destination module 705 may determine the destination of a JUMP instruction.

In one embodiment, processing device tool 715 may modify the resources used by the processing module 160 and/or may optimize the operation of the processing module 160 based on the control flow data 145. For example, the processing device tool 715 may instruct the processing module to deactivate, power down, and/or refrain from using some of the execution cores to reduce the amount of power used by the processing module. In another example, the processing device tool 715 may instruct the processing module 160 to prepare the circuits, components, and/or modules that are used by instructions in the upcoming instruction block. In one embodiment, the processing device tool 715 may determine whether the modification of resources used by the processing module is having an effect of the operation of the processing module. If the processing device tool 715 determines that the modification of resources used by the processing module is not having an effect of the operation of the processing module, the processing device tool 715 may update the control flow data to indicate that the modification of resources should not be performed.

In another embodiment, the processing device tool 715 may track the execution of the instructions in the application using the control flow data. For example, the processing device tool 715 may determine that the processing module is executing an instruction block that includes ten instructions. If the processing module jumps to another instruction after executing less than twelve instructions, the tracking module may determine that an error (e.g., a hard error and/or a soft error) has occurred. In another example, the processing module may execute the instructions in an instruction block using different processes, threads, and/or execution cores. As the processing module executes an instruction from an instruction block, the processing module may assign the instruction to a process, thread and/or execution core. The processing device tool 715 may add and/or update annotations to the control flow data to indicate which process, thread, and/or execution core an instruction in the instruction block is assigned to.

Figure 8:
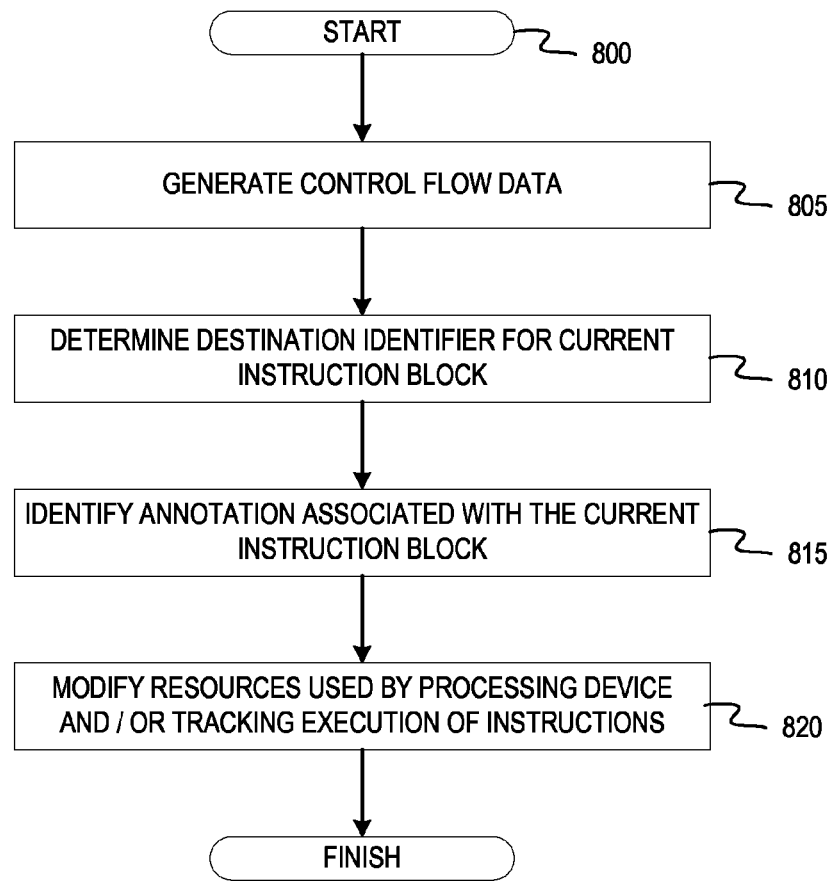
FIG. 8 is a flow diagram illustrating a method of tracking the control flow of instructions, according to one embodiment of the disclosure.

FIG. 8 is a flow diagram illustrating a method 800 of tracking the execution of instructions according to an embodiment. Method 800 may be performed by processing logic that may comprise hardware (e.g., circuitry, dedicated logic, programmable logic, microcode, etc.), software (such as instructions run on a processing device), firmware, or a combination thereof. In one embodiment, method 800 may be performed by one or more of control flow module 140 and tracking module 150, as illustrated in FIGS. 1, 6, and 7.

Referring to FIG. 8, the method 800 begins at block 805 where the method 800 generates control flow data (e.g., generates a table as illustrated in FIGS. 2, 4, and 5). In one embodiment, the method 800 may generate the control flow data when compiling source code for an application. In another embodiment, the method 800 may generate the control flow data when running the applications. For example, the method 800 may analyze instructions for the application as the instructions are executed by a processing module. In a further embodiment, the method 800 may generate control flow data based on a run-time profile. At block 810, the method 800 determines a destination identifier for a currently executing instruction block. For example, referring back to FIG. 2, the currently executing instruction block may be instruction block "1" and the method 800 may determine that instruction block "1" will branch or jump to instruction block "2." The method 800 identifies an annotation associated with the currently executing instruction block (at block 815). At block 820, the method 800 modifies the resources used by the processing module and/or tracks the execution of instructions, based on the control flow data. For example, the method 800 may deactivate components and/or circuits in the processing module. In another example, the method 800 may track the thread, process, and/or execution core where an instruction is assigned. In a further example, the method 800 may track the number of instructions in an instruction block (e.g., a basic block). After block 820, the method 800 ends.

Figure 9:
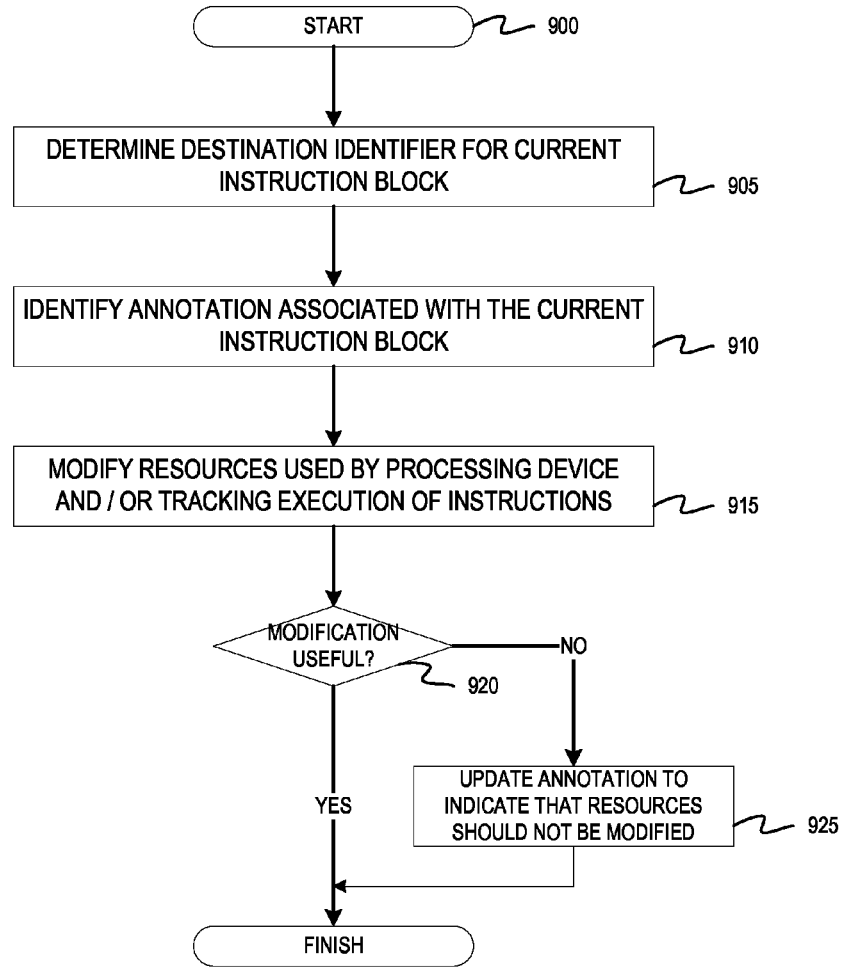
FIG. 9 is a flow diagram illustrating a method of tracking the control flow of instructions according to another embodiment of the disclosure.

FIG. 9 is a flow diagram illustrating a method 900 of tracking the execution of instructions according to another embodiment. Method 900 may be performed by processing logic that may comprise hardware (e.g., circuitry, dedicated logic, programmable logic, microcode, etc.), software (such as instructions run on a processing device), firmware, or a combination thereof. In one embodiment, method 900 may be performed by one or more of control flow module 140 and tracking module 150, as illustrated in FIGS. 1, 6, and 7.

Referring to FIG. 9 the method 900 begins at block 905, where the method 900 determines a destination identifier for a currently executing instruction block. For example, referring back to FIG. 2, the currently executing instruction block may be instruction block "5" and the method 800 may determine that instruction block "5" will branch or jump to instruction block "6." The method 900 identifies an annotation associated with the currently executing instruction block (at block 910). At block 915, the method 900 modifies the resources used by the processing module and/or tracks the execution of instructions, based on the control flow data. For example, the method 900 may deactivate components and/or circuits in the processing module. In another example, the method 900 may track the thread, process, and/or execution core where an instruction is assigned. In a further example, the method 900 may track the number of instructions in an instruction block (e.g., a basic block).

At block 920, the method 900 may determine whether the modifying the resources used by the processing module is useful (e.g., whether modifying the resources used by the processing module is affecting how the processing module operates). For example, the method 900 may determine whether deactivating one or more circuits in the processing module saves power. In another example, the method 900 may determine whether preparing certain components and/or circuits of the processing module to prepare for instructions in an upcoming instruction block speeds up the executions of the instructions. If modifying the resources is useful, the method 900 ends. If modifying the resources is not useful, the method 900 proceeds to block 925 where the method 900 updates the annotation to indicate that the resources should not be modified. For example, the method 900 may remove an annotation or may add data to the annotation indicating that the resources should not be modified. After block 925, the method 900 ends.

Figure 10:
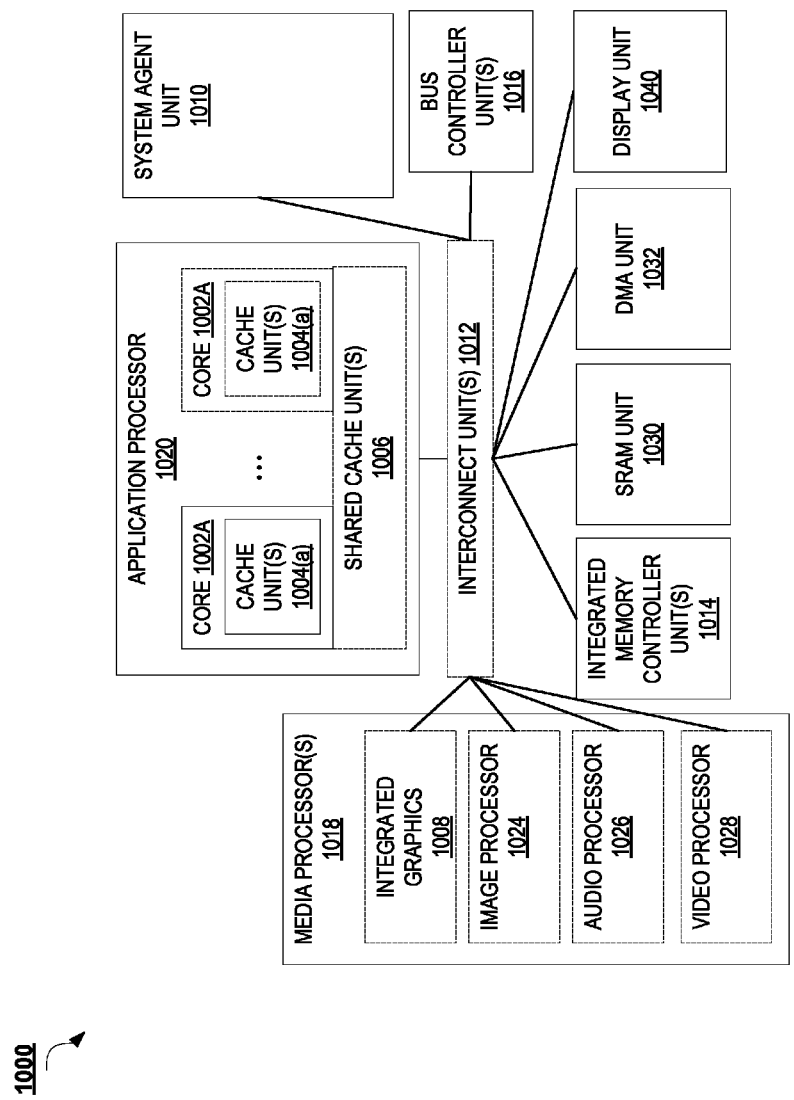
FIG. 10 is a block diagram of a system on chip (SoC) in accordance with an embodiment of the present disclosure.

FIG. 10 is a block diagram of a SoC 1000 in accordance with an embodiment of the present disclosure. Dashed lined boxes are optional features on more advanced SoCs. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multithreading.

The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 10010. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the application processor 1020 may be from another company, such as ARM Holdings, Ltd, MIPS, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
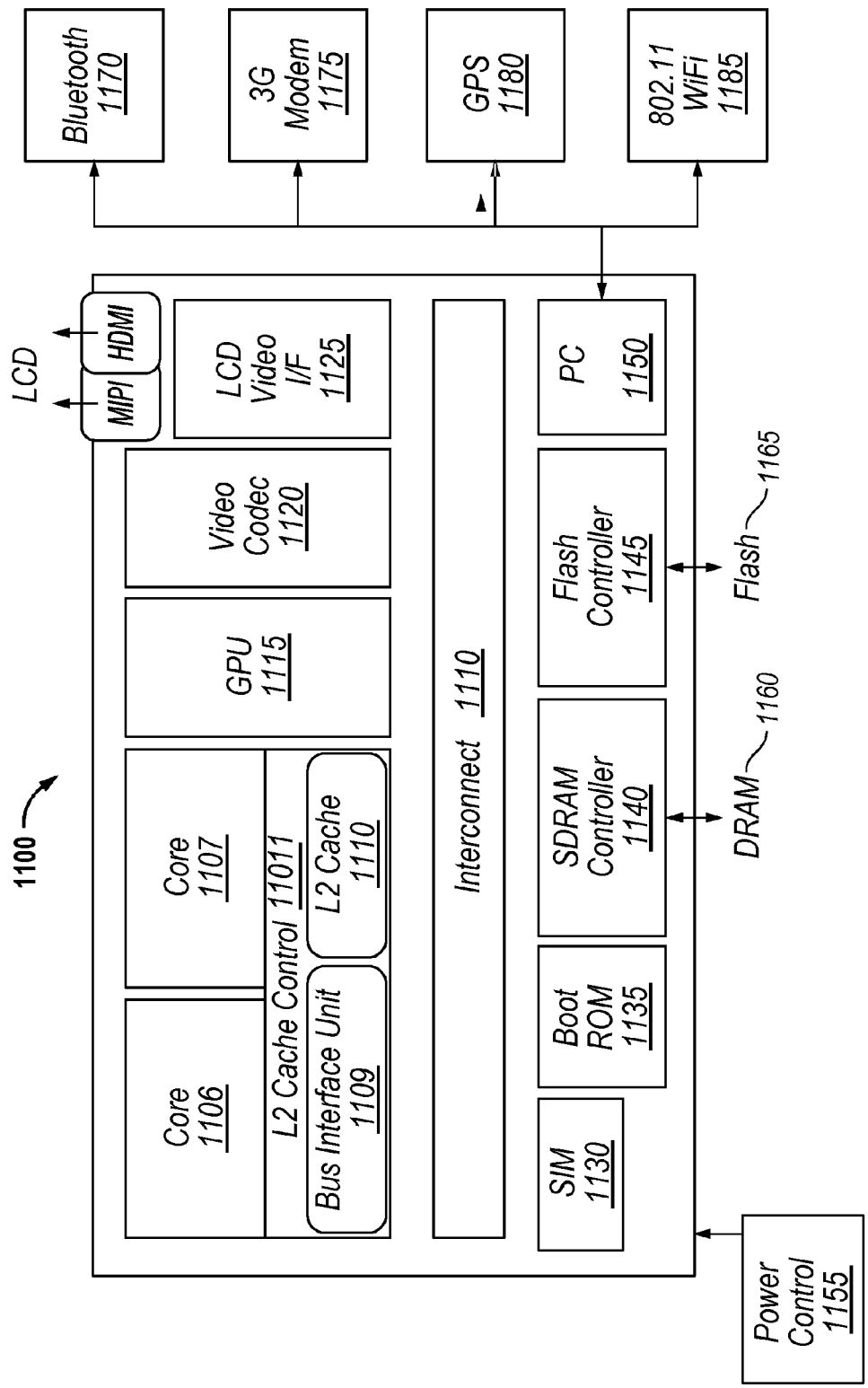
FIG. 11 is a block diagram of an embodiment of a system on-chip (SOC) design in accordance with the present disclosure.

FIG. 11 is a block diagram of an embodiment of a system on-chip (SOC) design in accordance with the present disclosure. As a specific illustrative example, SOC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1107 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure.

Interface 1110 provides communication channels to the other components, such as a Subscriber Identity Module (SIM) 1130 to interface with a SIM card, a boot rom 1135 to hold boot code for execution by cores 1106 and 1107 to initialize and boot SOC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein.

In addition, the system 1100 illustrates peripherals for communication, such as a Bluetooth module 1170, 3G modem 1175, GPS 1180, and Wi-Fi 1185. Note as stated above, a UE includes a radio for communication. As a result, these peripheral communication modules are not all required. However, in a UE, some form a radio for external communication is to be included.

Figure 12:
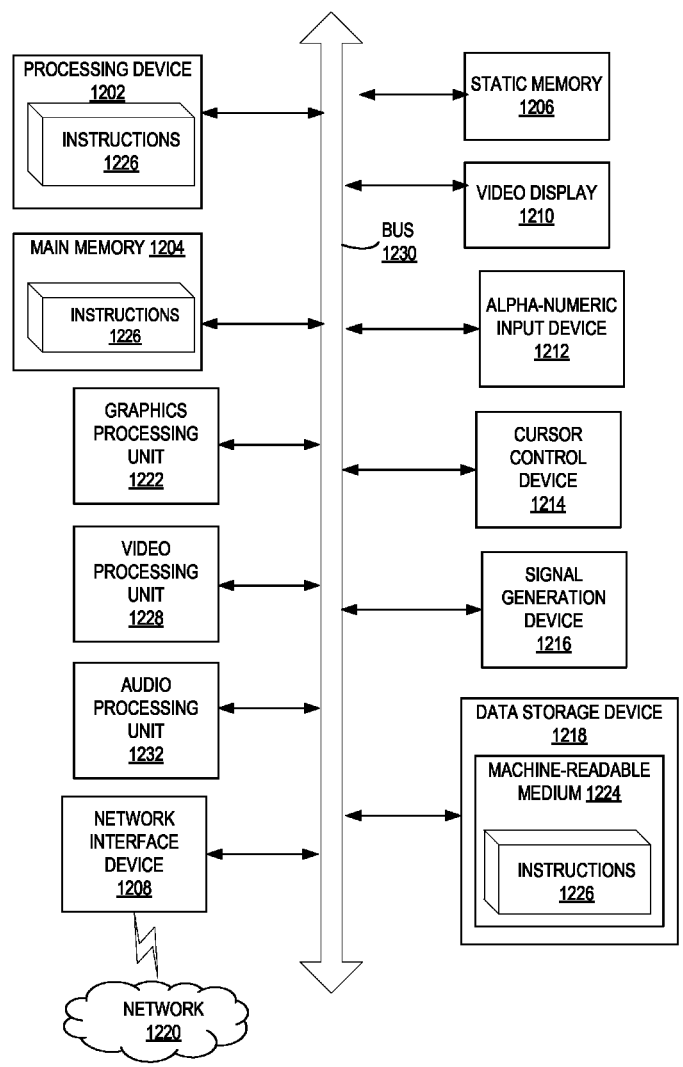
FIG. 12 illustrates a diagrammatic representation of a machine in the example form of a computer system within which a set of instructions, for causing the machine to perform any one or more of the methodologies discussed herein, may be executed.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the instructions 1226 for performing the operations discussed herein.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a signal generation device 1216 (e.g., a speaker), or other peripheral devices. Furthermore, computer system 1200 may include a graphics processing unit 1222, a video processing unit 1228, and an audio processing unit 1232. In another embodiment, the computer system 1200 may include a chipset (not illustrated), which refers to a group of integrated circuits, or chips, that are designed to work with the processing device 1202 and controls communications between the processing device 1202 and external devices. For example, the chipset may be a set of chips on a motherboard that links the processing device 1202 to very high-speed devices, such as main memory 1204 and graphic controllers, as well as linking the processing device 1202 to lower-speed peripheral buses of peripherals, such as USB, PCI or ISA buses.

The data storage device 1218 may include a computer-readable storage medium 1224 on which is stored instructions 1226 embodying any one or more of the methodologies of functions described herein. The instructions 1226 may also reside, completely or at least partially, within the main memory 1204 and/or within the processing device 1202 during execution thereof by the computer system 1200; the main memory 1204 and the processing device 1202 also constituting computer-readable storage media.

The computer-readable storage medium 1224 may also be used to store instructions 1226 utilizing the control flow module 140 and/or the tracking module 150, such as described with respect to FIGS. 1, 6, and 7 and/or a software library containing methods that call the above applications. While the computer-readable storage medium 1224 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

Figure 13:
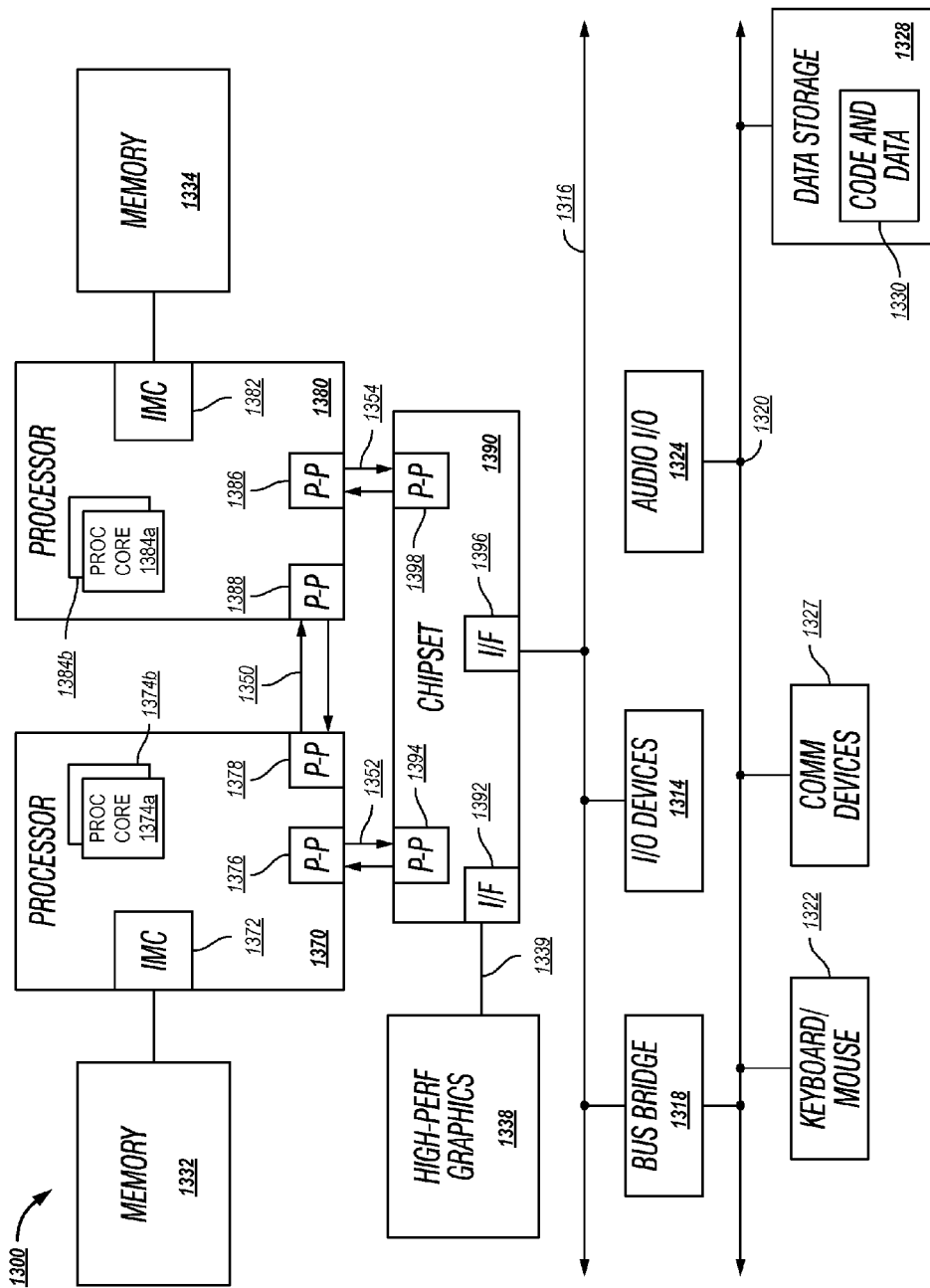
FIG. 13 is a block diagram of a computer system according to one implementation.

FIG. 13 is a block diagram of a multiprocessor system 1300 in accordance with an implementation. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processing device 602 of FIG. 6. As shown in FIG. 13, each of processors 1370 and 1380 may be multicore processors, including first and second processor cores (i.e., processor cores 1374*a* and 1374*b* and processor cores 1384*a* and 1384*b*), although potentially many more cores may be present in the processors. A processor core may also be referred to as an execution core. The processors each may include hybrid write mode logics in accordance with an embodiment of the present. In one embodiment, one or more of the processors 1370 and 1380 may execute a control flow module (e.g., control flow module 140 illustrated in FIG. 1). In another embodiment, a tracking module (e.g., tracking module 150 illustrated in FIG. 1) may be included in or may be part of one or more of the processors 1370 and 1380.

While shown with two processors 1370, 1380, it is to be understood that the scope of the present disclosure is not so limited. In other implementations, one or more additional processors may be present in a given processor.

Processors 1370 and 1380 are shown including integrated memory controller units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors. In one embodiment, control flow data (e.g., tables 200, 300, and 500 illustrated in FIGS. 2, 3, and 5) may be stored in one or more of the memories 1332 and 1334.

Processors 1370, 1380 may each exchange information with a chipset 1390 via individual P-P interfaces 1352, 1354 using point to point interface circuits 1376, 1394, 1386, and 1398. Chipset 1390 may also exchange information with a high-performance graphics circuit 1338 via a high-performance graphics interface 1339.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present disclosure is not so limited.

As shown in FIG. 13, various I/O devices 1314 may be coupled to first bus 1316, along with a bus bridge 1318 which couples first bus 1316 to a second bus 1320. In one embodiment, second bus 1320 may be a low pin count (LPC) bus. Various devices may be coupled to second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to second bus 1320. Note that other architectures are possible. For example, instead of the point-to-point architecture of FIG. 13, a system may implement a multi-drop bus or other such architecture.

Figure 14:
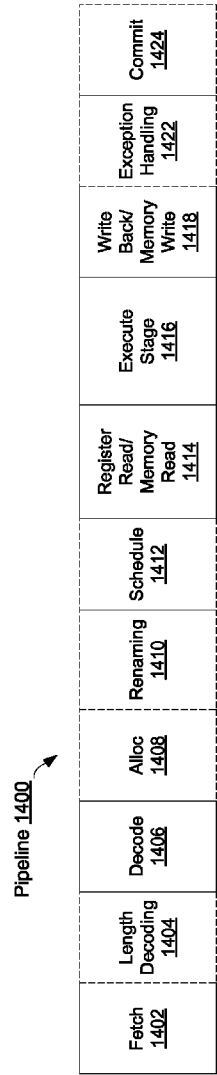
FIG. 14 is a block diagram illustrating an in-order pipeline and a register renaming stage, out-of-order issue/execution pipeline implemented by processing device 1400 of FIG. 14.

FIG. 14 is a block diagram illustrating an in-order pipeline and a register renaming stage, out-of-order issue/execution pipeline implemented by processing device 1400 of FIG. 14. FIG. 14 is a block diagram illustrating an in-order architecture core and a register renaming logic, out-of-order issue/execution logic to be included in a processor according to at least one embodiment of the invention. The solid lined boxes in FIG. 14 illustrate the in-order pipeline, while the dashed lined boxes illustrates the register renaming, out-of-order issue/execution pipeline. Similarly, the solid lined boxes in FIG. 14 illustrate the in-order architecture logic, while the dashed lined boxes illustrates the register renaming logic and out-of-order issue/execution logic. In FIG. 14, a processor pipeline 1400 includes a fetch stage 1402, a length decode stage 1404, a decode stage 1406, an allocation stage 1408, a renaming stage 1410, a scheduling (also known as a dispatch or issue) stage 1412, a register read/memory read stage 1414, an execute stage 1416, a write back/memory write stage 1418, an exception handling stage 1422, and a commit stage 1424.

Figure 15:
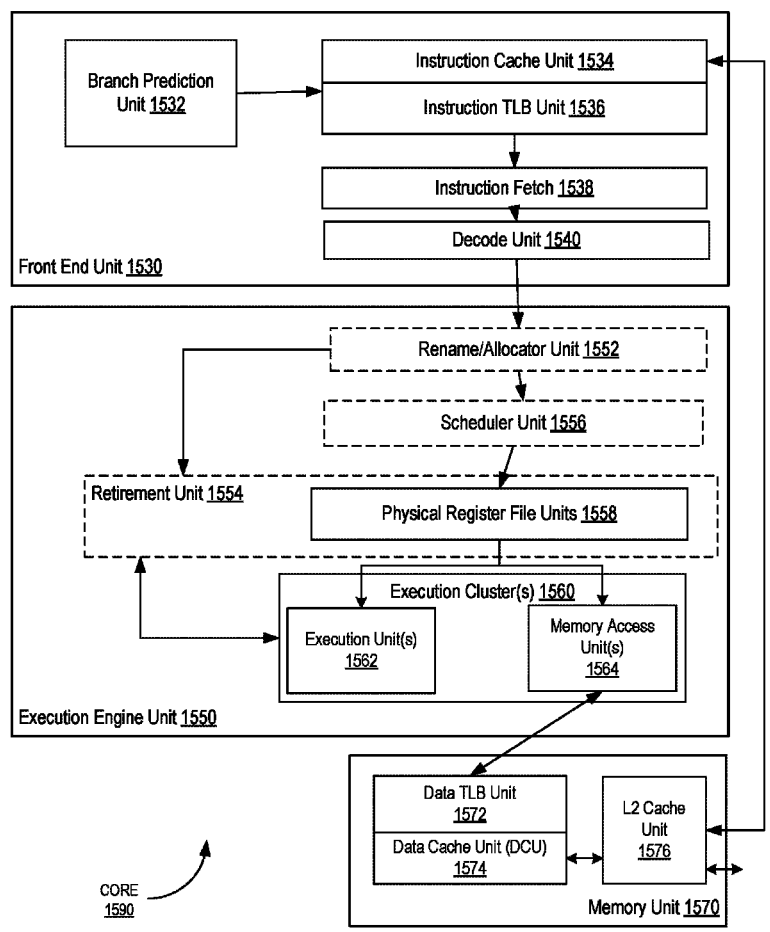
FIG. 15 is a block diagram illustrating an in-order architecture core and a register renaming logic, out-of-order issue/execution logic to be included in a processor according to at least one embodiment of the disclosure.

FIG. 15 is a block diagram illustrating an in-order architecture core and a register renaming logic, out-of-order issue/execution logic to be included in a processor according to at least one embodiment of the disclosure. In FIG. 15, arrows denote a coupling between two or more units and the direction of the arrow indicates a direction of data flow between those units. FIG. 15 shows processor core 1590 including a front end unit 1530 coupled to an execution engine unit 1550, and both are coupled to a memory unit 1570. In one embodiment, control flow data (e.g., tables 200, 300, and 500 illustrated in FIGS. 2, 3, and 5) may be stored in the memory unit 1570.

The core 1590 may be a reduced instruction set computing (RISC) core, a complex instruction set computing (CISC) core, a very long instruction word (VLIW) core, or a hybrid or alternative core type. As yet another option, the core 1590 may be a special-purpose core, such as, for example, a network or communication core, compression engine, graphics core, or the like. In one embodiment, core 1590 may execute a control flow module (e.g., control flow module 140 illustrated in FIG. 1). In another embodiment, a tracking module (e.g., tracking module 150 illustrated in FIG. 1) may be included in or may be part of the core 1590. For example, the tracking module may be part of the front end unit 1530 and/or execution engine unit 1550.

The front end unit 1530 includes a branch prediction unit 1532 coupled to an instruction cache unit 1534, which is coupled to an instruction translation lookaside buffer (TLB) 1536, which is coupled to an instruction fetch unit 1538, which is coupled to a decode unit 1540. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 1534 is further coupled to a level 2 (L2) cache unit 1576 in the memory unit 1570. The decode unit 1540 is coupled to a rename/allocator unit 1552 in the execution engine unit 1550.

The execution engine unit 1550 includes the rename/allocator unit 1552 coupled to a retirement unit 1554 and a set of one or more scheduler unit(s) 1556. The scheduler unit(s) 1556 represents any number of different schedulers, including reservations stations, central instruction window, etc. The scheduler unit(s) 1556 is coupled to the physical register file(s) unit(s) 1558. Each of the physical register file(s) units 1558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 1558 is overlapped by the retirement unit 1554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 1554 and the physical register file(s) unit(s) 1558 are coupled to the execution cluster(s) 1560. The execution cluster(s) 1560 includes a set of one or more execution units 162 and a set of one or more memory access units 1564. The execution units 1562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1556, physical register file(s) unit(s) 1558, and execution cluster(s) 1560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1564). It should also be understood that where separate pipelines are used, one or more of these pipelines may be out-of-order issue/execution and the rest in-order.

The set of memory access units 1564 is coupled to the memory unit 1570, which includes a data TLB unit 1572 coupled to a data cache unit 1574 coupled to a level 2 (L2) cache unit 1576. In one exemplary embodiment, the memory access units 1564 may include a load unit, a store address unit, and a store data unit, each of which is coupled to the data TLB unit 1572 in the memory unit 1570. The L2 cache unit 1576 is coupled to one or more other levels of cache and eventually to a main memory.

By way of example, the exemplary register renaming, out-of-order issue/execution core architecture may implement the pipeline 1400 as follows: 1) the instruction fetch 1538 performs the fetch and length decoding stages 1402 and 1404; 2) the decode unit 1540 performs the decode stage 1406; 3) the rename/allocator unit 1552 performs the allocation stage 1408 and renaming stage 1410; 4) the scheduler unit(s) 1556 performs the schedule stage 1412; 5) the physical register file(s) unit(s) 1558 and the memory unit 1570 perform the register read/memory read stage 1414; the execution cluster 1560 perform the execute stage 1416; 6) the memory unit 1570 and the physical register file(s) unit(s) 1558 perform the write back/memory write stage 1418; 7) various units may be involved in the exception handling stage 1422; and 8) the retirement unit 1554 and the physical register file(s) unit(s) 1558 perform the commit stage 1424.

The core 1590 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units 1534/1574 and a shared L2 cache unit 1576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 16:
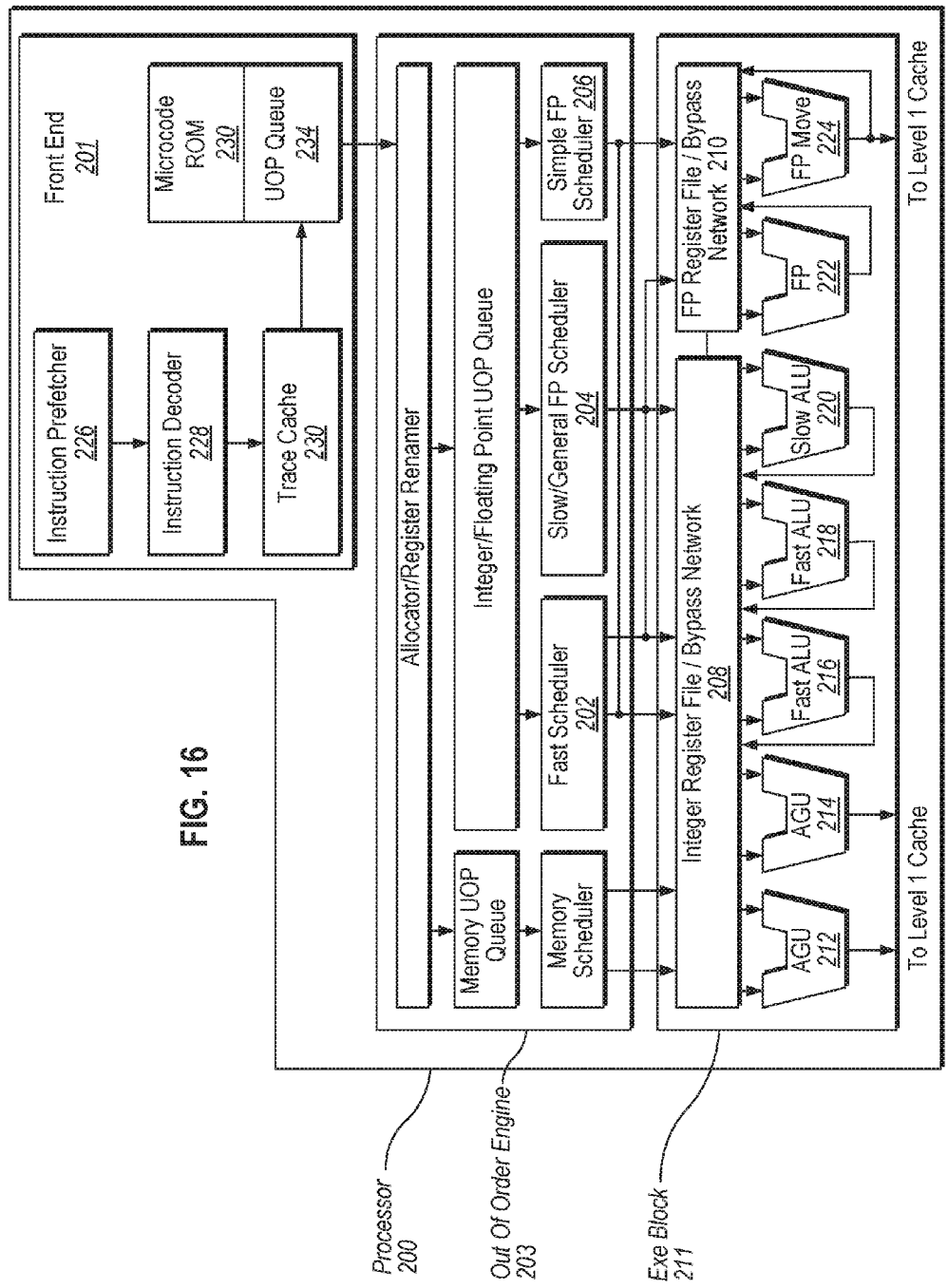
FIG. 16 is a block diagram of the micro-architecture for a processor 200 that includes logic circuits to perform instructions in accordance with one embodiment of the present invention.

FIG. 16 is a block diagram of the micro-architecture for a processor 200 that includes logic circuits to perform instructions in accordance with one embodiment of the present invention. In some embodiments, an instruction in accordance with one embodiment can be implemented to operate on data elements having sizes of byte, word, doubleword, quadword, etc., as well as datatypes, such as single and double precision integer and floating point datatypes. In one embodiment, the processor 200 may execute a control flow module (e.g., control flow module 140 illustrated in FIG. 1). In one embodiment, the processor 200 may also include a tracking module (e.g., tracking module 150 illustrated in FIG. 1). For example, the tracking module may be part of the front end 201 and/or the out of order engine 203. In one embodiment the in-order front end 201 is the part of the processor 200 that fetches instructions to be executed and prepares them to be used later in the processor pipeline. The front end 201 may include several units. In one embodiment, the instruction prefetcher 226 fetches instructions from memory and feeds them to an instruction decoder 228 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 230 takes decoded uops and assembles them into program ordered sequences or traces in the uop queue 234 for execution. When the trace cache 230 encounters a complex instruction, the microcode ROM 232 provides the uops needed to complete the operation.

Some instructions are converted into a single micro-op, whereas others need several micro-ops to complete the full operation. In one embodiment, if more than four micro-ops are needed to complete an instruction, the decoder 228 accesses the microcode ROM 232 to do the instruction. For one embodiment, an instruction can be decoded into a small number of micro ops for processing at the instruction decoder 228. In another embodiment, an instruction can be stored within the microcode ROM 232 should a number of micro-ops be needed to accomplish the operation. The trace cache 230 refers to an entry point programmable logic array (PLA) to determine a correct micro-instruction pointer for reading the micro-code sequences to complete one or more instructions in accordance with one embodiment from the micro-code ROM 232. After the microcode ROM 232 finishes sequencing micro-ops for an instruction, the front end 201 of the machine resumes fetching micro-ops from the trace cache 230.

The out-of-order execution engine 203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206, determine when a uop is ready to execute based on the readiness of their dependent input register operand sources and the availability of the execution resources the uops need to complete their operation. The fast scheduler 202 of one embodiment can schedule on each half of the main clock cycle while the other schedulers can only schedule once per main processor clock cycle. The schedulers arbitrate for the dispatch ports to schedule uops for execution.

Register files 208, 210, sit between the schedulers 202, 204, 206, and the execution units 212, 214, 216, 218, 220, 222, 224 in the execution block 211. There is a separate register file 208, 210, for integer and floating point operations, respectively. Each register file 208, 210, of one embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of one embodiment is comprised of a number of execution units: address generation unit (AGU) 212, AGU 214, fast ALU 216, fast ALU 218, slow ALU 220, floating point ALU 222, floating point move unit 224. For one embodiment, the floating point execution blocks 222, 224, execute floating point, MMX, SIMD, and SSE, or other operations. The floating point ALU 222 of one embodiment includes a 64 bit by 64 bit floating point divider to execute divide, square root, and remainder micro-ops. For embodiments of the present invention, instructions involving a floating point value may be handled with the floating point hardware. In one embodiment, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220, are described in the context of performing integer operations on 64 bit data operands. In alternative embodiments, the ALUs 216, 218, 220, can be implemented to support a variety of data bits including 16, 32, 128, 256, etc. Similarly, the floating point units 222, 224, can be implemented to support a range of operands having bits of various widths. For one embodiment, the floating point units 222, 224, can operate on 128 bits wide packed data operands in conjunction with SIMD and multimedia instructions.

In one embodiment, the uops schedulers 202, 204, 206, dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

The following examples pertain to further embodiments.

Example 1 is an apparatus having a memory module to store control flow data comprising a plurality of block identifiers for blocks of instructions, destination identifiers for one or more of the blocks of the instructions, and annotations for the blocks of instructions, and a processor communicably coupled to the memory module. The processor is configured to receive the control flow data, determine a destination identifier for a current instruction block based on the control flow data, identify an annotation associated with the current instruction block based on the control flow data, and perform at least one of modifying resources used by the processor or tracking execution of the blocks of instructions based on one or more of the annotation or the destination identifier.

Example 2 may optionally extend the subject matter of example 1. In Example 2, the processor is further configured to generate the control flow data during one or more of compile-time or run-time of an application comprising the blocks of instructions.

Example 3 may optionally extend the subject matter of any one of examples 1 and 2. In example 3, the processor is further configured to obtain a runtime profile of an application comprising the blocks of instructions; and generate the control flow data based on the runtime profile.

Example 4 may optionally extend the subject matter of any one of examples 1-3. In example 4, the control flow data comprises one or more of a table, a list, a graph, or a tree.

Example 5 may optionally extend the subject matter of any one of examples 1-4. In example 5, the processor tracks the execution of the blocks of instructions by detecting one or more of a hard error in the memory or a soft error in the execution of the blocks of instructions based on the annotation, wherein the annotation indicates a number of instructions within the current instruction block.

Example 6 may optionally extend the subject matter of any one of examples 1-5. In example 6, the processor modifies the resources used by the processor by reducing a number of components used by the processor based on the annotation.

Example 7 may optionally extend the subject matter of any one of examples 1-6. In example 7, the processor tracks the execution of the blocks of instructions by identifying one or more of a thread, a process, or an execution core where an instruction from the current instruction is assigned and updating the annotation with data identifying the one or more of the thread, the process, or the execution core where the instruction is assigned.

Example 8 may optionally extend the subject matter of any one of examples 1-7. In example 8, generating the control flow data includes converting indirect branch instructions into one or more of compare instructions or jump instructions.

Example 9 may optionally extend the subject matter of any one of examples 1-8. In example 8, the processor is further configured to determine whether modifying the resources used by the processor is affecting an operation of the processor and update the annotation to indicate that the resources used by the processor should not be optimized when modifying the resources does not affect the operation of the processor.

Example 10 may optionally extend the subject matter of any one of examples 1-9. In example 10, the processor is further to configured to determine a second destination identifier for a second current instruction block based on the control flow data, identify a second annotation associated with the second current instruction block based on the control flow data, and perform one or more of modifying resources used by the processor or tracking execution of the blocks of instructions based on one or more of the second annotation or the second destination identifier.

Example 11 is a method comprising receiving control flow data comprising a plurality of block identifiers for blocks of instructions, destination identifiers for one or more of the blocks of the instructions, and annotations for the blocks of instructions, determining a destination identifier for a current instruction block based on the control flow data, identifying an annotation associated with the current instruction block based on the control flow data, and performing at least one of modifying resources used by a processor or tracking execution of the blocks of instructions based on one or more of the annotation or the destination identifier.

Example 12 may optionally extend the subject matter of example 12. In Example 12, the method further comprises generating the control flow data during one or more of compile-time or run-time of an application comprising the blocks of instructions.

Example 13 may optionally extend the subject matter of any one of examples 11-12. In example 13, the method further comprises obtaining a runtime profile of an application comprising the blocks of instructions and generating the control flow data based on the runtime profile.

Example 14 may optionally extend the subject matter of any one of examples 11-13. In example 14, the control flow data comprises one or more of a table, a list, a graph, or a tree.

Example 15 may optionally extend the subject matter of any one of examples 11-14. In example 15, tracking the execution of the blocks of instructions comprises detecting one or more of a hard error in a memory or a soft error in the execution of the blocks of instructions based on the annotation, wherein the annotation indicates a number of instructions within the current instruction block.

Example 16 may optionally extend the subject matter of any one of examples 11-15. In example 16, modifying the resources used by the processor comprises reducing a number of components used by the processor based on the annotation.

Example 17 may optionally extend the subject matter of any one of examples 11-16. In example 17, tracking the execution of the blocks of instructions comprises identifying one or more of a thread, a process, or an execution core where an instruction from the current instruction is assigned and updating the annotation with data identifying the one or more of the thread, the process, or the execution core where the instruction is assigned.

Example 18 may optionally extend the subject matter of any one of examples 11-17. In example 18, generating the control flow data comprises converting indirect branch instructions into one or more of compare instructions or jump instructions.

Example 19 may optionally extend the subject matter of any one of examples 11-18. In example 19, the method further comprises determining whether modifying the resources used by the processor is affecting an operation of the processor and updating the annotation to indicate that the resources used by the processor should not be optimized when modifying the resources does not affect the operation of the processor.

Example 20 may optionally extend the subject matter of any one of examples 11-19. In example 20, the method further comprises determining a second destination identifier for a second current instruction block based on the control flow data, identifying a second annotation associated with the second current instruction block based on the control flow data, and performing one or more of modifying resources used by the processor or tracking execution of the blocks of instructions based on one or more of the second annotation or the second destination identifier.

Example 21 is a non-transitory machine-readable storage medium including data that, when accessed by a processor, cause the processor to perform operations comprising receiving control flow data comprising a plurality of block identifiers for blocks of instructions, destination identifiers for one or more of the blocks of the instructions, and annotations for the blocks of instructions, determining a destination identifier for a current instruction block based on the control flow data, identifying an annotation associated with the current instruction block based on the control flow data, and performing at least one of modifying resources used by the processor or tracking execution of the blocks of instructions based on one or more of the annotation or the destination identifier.

Example 22 may optionally extend the subject matter of example 21. In example 22, the operations further comprise generating the control flow data during one or more of compile-time or run-time of an application comprising the blocks of instructions.

Example 23 may optionally extend the subject matter of any one of examples 20-22. In example 23, the operations further comprise obtaining a runtime profile of an application comprising the blocks of instructions, and generating the control flow data based on the runtime profile.

Example 24 may optionally extend the subject matter of any one of examples 20-23. In example 24, the control flow data comprises one or more of a table, a list, a graph, or a tree.

Example 25 may optionally extend the subject matter of any one of examples 20-24. In example 25, tracking the execution of the blocks of instructions comprises detecting one or more of a hard error in a memory or a soft error in the execution of the blocks of instructions based on the annotation, wherein the annotation indicates a number of instructions within the current instruction block.

Example 26 may optionally extend the subject matter of any one of examples 20-25. In example 26, modifying the resources used by the processor comprises reducing a number of components used by the processor based on the annotation.

Example 27 may optionally extend the subject matter of any one of examples 20-26. In example 27, tracking the execution of the blocks of instructions comprises identifying one or more of a thread, a process, or an execution core where an instruction from the current instruction is assigned, and updating the annotation with data identifying the one or more of the thread, the process, or the execution core where the instruction is assigned.

Example 28 may optionally extend the subject matter of any one of examples 20-27. In example 28, generating the control flow data comprises converting indirect branch instructions into one or more of compare instructions or jump instructions.

Example 29 may optionally extend the subject matter of any one of examples 20-28. In example 29, the operations further comprise determining whether modifying the resources used by the processor is affecting an operation of the processor, and updating the annotation to indicate that the resources used by the processor should not be optimized when modifying the resources does not affect the operation of the processor.

Example 30 may optionally extend the subject matter of any one of examples 20-29. In example 30, the operations further comprise determine a second destination identifier for a second current instruction block based on the control flow data, identify a second annotation associated with the second current instruction block based on the control flow data, and perform one or more of modifying resources used by the processor or tracking execution of the blocks of instructions based on one or more of the second annotation or the second destination identifier.

Example 31 is an apparatus comprising means for storing control flow data comprising a plurality of block identifiers for blocks of instructions, destination identifiers for one or more of the blocks of the instructions, and annotations for the blocks of instructions, means for receiving the control flow data, means for determining a destination identifier for a current instruction block based on the control flow data, means for identifying an annotation associated with the current instruction block based on the control flow data, and means for performing at least one of modifying resources used by a processor or tracking execution of the blocks of instructions based on one or more of the annotation or the destination identifier.

Example 32 may optionally extend the subject matter of example 31. In example 32, the apparatus of claim 31 further comprises means for generating the control flow data during one or more of compile-time or run-time of an application comprising the blocks of instructions.

Example 33 may optionally extend the subject matter of any of examples 31-32. In example 33, the apparatus further comprises means for obtaining a runtime profile of an application comprising the blocks of instructions, and means for generating the control flow data based on the runtime profile.

Example 34 may optionally extend the subject matter of any of examples 31-33. In example 34, the control flow data comprises one or more of a table, a list, a graph, or a tree.

Example 35 may optionally extend the subject matter of any of examples 31-34. In example 35, tracking the execution of the blocks of instructions comprises detecting one or more of a hard error in a memory or a soft error in the execution of the blocks of instructions based on the annotation, wherein the annotation indicates a number of instructions within the current instruction block.

Example 36 may optionally extend the subject matter of any of examples 31-35. In example 36, modifying the resources used by the processor comprises reducing a number of components used by the processor based on the annotation.

Example 37 may optionally extend the subject matter of any of examples 31-36. In example 37, tracking the execution of the blocks of instructions comprises identifying one or more of a thread, a process, or an execution core where an instruction from the current instruction is assigned, and updating the annotation with data identifying the one or more of the thread, the process, or the execution core where the instruction is assigned.

Example 38 may optionally extend the subject matter of any of examples 31-37. In example 38, generating the control flow data comprises converting indirect branch instructions into one or more of compare instructions or jump instructions.

Example 39 may optionally extend the subject matter of any of examples 31-38. In example 39, the apparatus further comprises means for determining whether modifying the resources used by the processor is affecting an operation of the processor, and means for updating the annotation to indicate that the resources used by the processor should not be optimized when modifying the resources does not affect the operation of the processor.

Example 40 may optionally extend the subject matter of any of examples 31-39. In example 40, the apparatus further comprises means for determining a second destination identifier for a second current instruction block based on the control flow data, means for identifying a second annotation associated with the second current instruction block based on the control flow data, and means for performing one or more of modifying resources used by the processor or tracking execution of the blocks of instructions based on one or more of the second annotation or the second destination identifier.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware, or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "identifying," "determining," "performing," "tracking," "modifying," "obtaining," "generating," "detecting," "reducing," "updating," "converting," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. An apparatus comprising:
   a memory to store software code including a plurality of blocks of instructions, wherein a block of instructions includes a plurality of instructions with one entry point and one exit point; and
   a processor communicably coupled to the memory, the processor to:
      execute one of a compiler or a binary analyzer to generate a runtime profile based on execution of the plurality of blocks of instructions, wherein the runtime profile includes processing components used by, and control flow data produced from, execution of the plurality of blocks of instructions; and
      generate a control flow table using the runtime profile;
      index the plurality of blocks of instructions within the control flow table with a plurality of block identifiers, wherein execution transitions between the plurality of blocks of instructions are encoded into the control flow table using destination identifiers according to indexing within the control flow table;
      assign an instruction of a first block of instructions of the plurality of blocks of instructions to a first processor core as a first thread assignment;
      assign the instruction to a second processor core as a second thread assignment;
      populate the control flow table with annotations for the plurality of blocks of instructions, wherein the annotations comprise an annotation of the first thread assignment and the second thread assignment of the instruction of the first block of instructions;
      receive the control flow data from execution of the plurality of blocks of instructions;
      determine a destination identifier, from an entry indexed within the control flow table, for the first block of instructions;
      identify, responsive to a look up of the destination identifier in the control flow table, the annotation associated with the instruction of the first block of instructions; and
      prepare particular processing components needed for executing the instruction of the first block of instructions based on the first thread assignment and the second thread assignment identified in the annotation for the first block of instructions, as identified in the control flow table.

2. The apparatus of claim 1, wherein the processor is further to generate the control flow data during one or more of compile-time or run-time of an application comprising the plurality of blocks of instructions.

3. The apparatus of claim 2, wherein to generate the runtime profile comprises to convert indirect branch instructions into a pair of compare instructions and jump instructions.

4. The apparatus of claim 1, wherein the control flow data comprises one or more of a table, a list, a graph, or a tree.

5. The apparatus of claim 1, wherein the processor is further to track the execution of the plurality of blocks of instructions by detecting one or more of a hard error in the memory or a soft error in the execution of the plurality of blocks of instructions based on the annotation, wherein the annotation further indicates a number of instructions within the first block of instructions.

6. The apparatus of claim 1, wherein the processor is further to track the execution of the plurality of blocks of instructions by:
   identifying one or more of a process or an execution core where the instruction from the first block of instructions is assigned; and
   updating the annotation with data identifying the one or more of the process or the execution core to which the instruction from the first block of instructions is assigned.

7. The apparatus of claim 1, wherein the processor is further to:
   modify the particular processing components used by the processor;
   determine whether modifying the particular processing components used by the processor is affecting an operation of the processor; and
   update the annotation to indicate that the particular processing components used by the processor should not be optimized when modifying the particular processing components does not affect the operation of the processor.

8. The apparatus of claim 1, wherein the processor is further to:
   determine a second destination identifier for a subsequent block of instructions based on the control flow data;
   identify a second annotation associated with the subsequent block of instructions from a look up of the second destination identifier in the control flow table; and
   perform one or more of modifying the particular processing components used by the processor or tracking execution of the plurality of blocks of instructions based on the second annotation and the plurality of instructions from the subsequent block of instructions.

9. A method comprising:
   retrieving, from memory, software code including a plurality of blocks of instructions, wherein a block of instructions includes a plurality of instructions with one entry point and one exit point;
   executing, by a processor, one of a compiler or a binary analyzer to generate a runtime profile based on execution of the plurality of blocks of instructions, wherein the runtime profile includes processing components used by, and control flow data produced from, execution of the plurality of blocks of instructions; and
   generating, by the processor, a control flow table using the runtime profile;
   indexing, by the processor, the plurality of blocks of instructions within the control flow table with a plurality of block identifiers, wherein execution transitions between the plurality of blocks of instructions are encoded into the control flow table using destination identifiers according to the indexing;

assigning, by the processor, an instruction of a first block of instructions of the plurality of blocks of instructions to a first processor core as a first thread assignment;

assigning, by the processor, the instruction to a second processor core as a second thread assignment;

populating the control flow table with annotations for the plurality of blocks of instructions, wherein the annotations comprise an annotation of the first thread assignment and the second thread assignment of the instruction of the first block of instructions;

receiving the control flow data from execution of the plurality of blocks of instructions;

determining, by the processor, a destination identifier, from an entry indexed within the control flow table, for the first block of instructions;

identifying, by the processor and responsive to a look up of the destination identifier in the control flow table, the annotation associated with the instruction of the first block of instructions; and preparing, by the processor, particular processing components needed for executing the instruction of the first block of instructions based on the first thread assignment and the second thread assignment identified in the annotation for the first block of instructions, as identified in the control flow table.

10. The method of claim 9, wherein the method further comprises generating the control flow data during one or more of compile-time or run-time of an application comprising the plurality of blocks of instructions.

11. The method of claim 10, wherein generating the runtime profile comprises converting indirect branch instructions into one or more of compare instructions and jump instructions.

12. The method of claim 9, wherein the control flow data comprises one or more of a table, a list, a graph, or a tree.

13. The method of claim 9, further comprising tracking the execution of the plurality of blocks of instructions by detecting one or more of a hard error in a memory or a soft error in the execution of the plurality of blocks of instructions based on the annotation, wherein the annotation further indicates a number of instructions within the first block of instructions.

14. The method of claim 9, further comprising tracking the execution of the blocks of instructions by:
identifying one or more of a process or an execution core where the instruction from the first block of instructions is assigned; and
updating the annotation with data identifying the one or more of the process or the execution core to which the instruction from the first block of instructions is assigned.

15. The method of claim 9, wherein the method further comprises:
modifying the particular processing components used by the processor;
determining whether modifying the particular processing components used by the processor is affecting an operation of the processor; and
updating the annotation to indicate that the particular processing components used by the processor should not be optimized when modifying the particular processing components does not affect the operation of the processor.

16. The method of claim 9, wherein the method further comprises:

determining a second destination identifier for a subsequent block of instructions based on the control flow data;

identifying a second annotation associated with the subsequent block of instructions from a look up of the second destination identifier in the control flow table; and performing one or more of modifying the particular processing components used by the processor or tracking execution of the plurality of blocks of instructions based on the second annotation and the plurality of instructions of the subsequent block of instructions.

17. A non-transitory machine-readable storage medium including instructions that, when executed by a processor, cause the processor to perform operations comprising:

retrieving, from memory, software code including a plurality of blocks of instructions, wherein a block of instructions includes a plurality of instructions with one entry point and one exit point;

executing one of a compiler or a binary analyzer to generate a runtime profile based on execution of the plurality of blocks of instructions, wherein the runtime profile includes processing components used by, and control flow data produced from, execution of the plurality of blocks of instructions; and generating a control flow table using the runtime profile;

indexing the plurality of blocks of instructions within the control flow table with a plurality of block identifiers, wherein execution transitions between the plurality of blocks of instructions are encoded into the control flow table using destination identifiers according to the indexing;

assigning an instruction of a first block of instructions of the plurality of blocks of instructions to a first processor core as a first thread assignment;

assigning the instruction to a second processor core as a second thread assignment;

populating the control flow table with annotations for the plurality of blocks of instructions, wherein the annotations comprise an annotation of the first thread assignment and the second thread assignment of the instruction of the first block of instructions;

receiving the control flow data from execution of the plurality of blocks of instructions;

determining a destination identifier, from an entry indexed within the control flow table, for the first block of instructions;

identifying, responsive to a look up of the destination identifier in the control flow table, the annotation associated with the instruction of the first block of instructions; and preparing particular processing components needed for executing the instruction of the first block of instructions based on the first thread assignment and the second thread assignment identified in the annotation for the first block of instructions, as identified in the control flow table.

18. The non-transitory machine-readable storage medium of claim 17, wherein the processor is further to execute the instructions to track the execution of the plurality of blocks of instructions by detecting one or more of a hard error in a memory or a soft error in the execution of the plurality of blocks of instructions based on the annotation, wherein the annotation further indicates a number of instructions within the first block of instructions.

19. The non-transitory machine-readable storage medium of claim 17, wherein the processor is further to execute the instructions to track the execution of the blocks of instructions by:
   identifying one or more of a process or an execution core where an instruction from the first block of instructions is assigned; and
   updating the annotation with data identifying the one or more of the process or the execution core to which the instruction is assigned.

20. The non-transitory machine-readable storage medium of claim 17, wherein the processor is further to execute the instructions to:
   modify the particular processing components used by the processor;
   determine whether modifying the particular processing components used by the processor is affecting an operation of the processor; and
   update the annotation to indicate that the particular processing components used by the processor should not be optimized when modifying the particular processing components does not affect the operation of the processor.

21. An apparatus comprising: a memory to store software code including a plurality of blocks of instructions, wherein a block of instructions includes a plurality of instructions with one entry point and one exit point; and a processor communicably coupled to the memory, the processor to: execute one of a compiler or a binary analyzer to generate a runtime profile based on execution of the plurality of blocks of instructions, wherein the runtime profile includes processing components used by, and control flow data produced from, execution of the plurality of blocks of instructions; and generate a control flow table using the runtime profile; index the plurality of blocks of instructions within the control flow table with a plurality of block identifiers, wherein execution transitions between the plurality of blocks of instructions are encoded into the control flow table using destination identifiers according to the indexing; assign an instruction of a first block of instructions of the plurality of blocks of instructions to a first processor core as a first thread assignment; assign the instruction to a second processor core as a second thread assignment; populate the control flow table with annotations for the plurality of blocks of instructions, wherein the annotations comprise an annotation of the first thread assignment and the second thread assignment of the instruction of the first block of instructions; receive the control flow data from execution of the plurality of blocks of instructions; determine a destination identifier; from an entry indexed within the control flow table, for the first block of instructions; identify, responsive to a look up of the destination identifier in the control flow table, the annotation associated with the instruction of the first block of; and track the execution of the first block of instructions by: identifying one or more of the first processor core and second processor core or a process to which an instruction from the first block of instructions is assigned; and updating the annotation with data identifying the one or more of the first processor core and second processor core or the process to which the instruction from the first block of instructions is assigned.

22. The apparatus of claim 21, wherein, to track execution of the plurality of blocks of instructions, the processor is further to detect one or more of a hard error in the memory or a soft error in the execution of the plurality of blocks of instructions based on the annotation, wherein the annotation further indicates a number of instructions within the first instruction block.

23. The apparatus of claim 21, wherein the processor is further to:
   modify particular processing components used by the processor;
   determine whether modifying the particular processing components used by the processor is affecting an operation of the processor; and
   update the annotation to indicate that the particular processing components used by the processor should not be optimized when modifying the particular processing components does not affect the operation of the processor.

* * * * *